(12) United States Patent
Hu et al.

(10) Patent No.: US 11,962,211 B2
(45) Date of Patent: Apr. 16, 2024

(54) VIBRATION MODULE

(71) Applicant: TDK TAIWAN CORP., Taoyuan (TW)

(72) Inventors: Chao-Chang Hu, Taoyuan (TW);
Liang-Ting Ho, Taoyuan (TW);
Che-Wei Chang, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 443 days.

(21) Appl. No.: 17/006,306

(22) Filed: Aug. 28, 2020

(65) Prior Publication Data

US 2021/0143718 A1 May 13, 2021

Related U.S. Application Data

(60) Provisional application No. 62/932,625, filed on Nov. 8, 2019.

(51) Int. Cl.
| | |
|---|---|
| *H02K 33/18* | (2006.01) |
| *B06B 1/02* | (2006.01) |
| *H02K 33/02* | (2006.01) |
| *H02K 33/12* | (2006.01) |
| *H02K 41/02* | (2006.01) |
| *H02N 2/02* | (2006.01) |
| *B06B 1/04* | (2006.01) |

(52) U.S. Cl.
CPC ............... *H02K 41/02* (2013.01); *B06B 1/02* (2013.01); *H02K 33/02* (2013.01); *H02K 33/12* (2013.01); *H02N 2/02* (2013.01); *B06B 1/045* (2013.01)

(58) Field of Classification Search
CPC ............................... H02K 33/02; H02K 33/18
See application file for complete search history.

(56) References Cited

U.S. PATENT DOCUMENTS

2017/0149320 A1* 5/2017 Mori ...................... H02K 33/18

FOREIGN PATENT DOCUMENTS

KR 20140022498 A * 2/2014

* cited by examiner

*Primary Examiner* — Ramon M Barrera
(74) *Attorney, Agent, or Firm* — MUNCY, GEISSLER, OLDS & LOWE, P.C.

(57) ABSTRACT

A vibration module is provided, having a main axis passing through the center of the vibration module. The vibration module includes a fixed part and a first vibration part. The first vibration part is disposed within the fixed part. The first vibration part includes a first moving member and a first driving assembly. The first driving assembly drives the first moving member to move along the main axis relative to the fixed part.

17 Claims, 25 Drawing Sheets

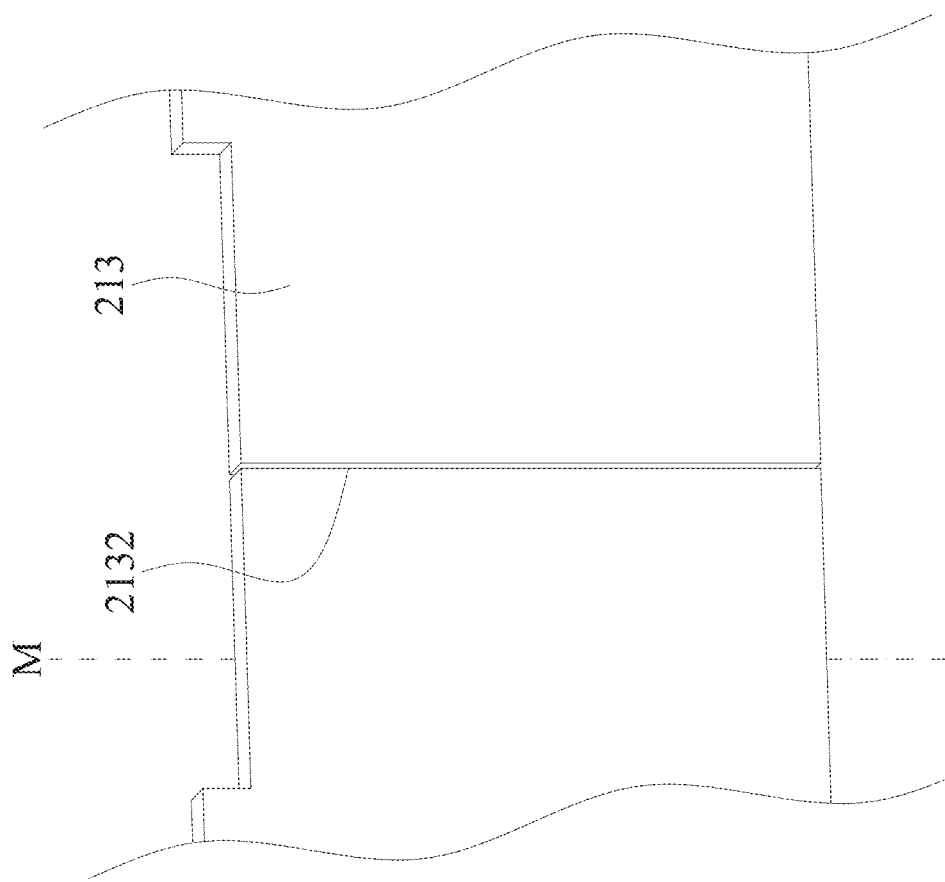
FIG. 3D
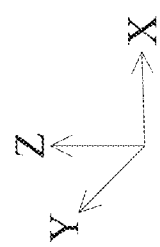

VIBRATION MODULE

CROSS-REFERENCE TO RELATED APPLICATIONS

The present application claims priority of U.S. Provisional Patent Application No. 62/932,625, filed on Nov. 8, 2019, the entirety of which is incorporated by reference herein.

BACKGROUND OF THE DISCLOSURE

Field of the Disclosure

The present invention relates to a vibration module, and in particular, to a linear vibration module.

Description of the Related Art

With the development of technology, many electronic devices (such as tablets or smartphones) nowadays have vibrating alarms and notifications. These electronic devices may vibrate to alert the user via a vibration module disposed on the electronic devices when performing a specific function. For example, the electronic devices may vibrate to inform the user when the electronic device receives a message or when the user presses buttons on the electronic device.

In the vibration modules currently in use, a rotating motor rotates an eccentric element to generate vibration. However, the aforementioned rotating motor is a conventional direct current (DC) brushed motor, so that the thickness of the vibration module may not be reduced any further. Furthermore, since the aforementioned eccentric element is disposed outside the rotating motor and is connected to the rotating axis of the rotating motor, and as a result the length of the vibration module may not be reduced any further, and therefore the vibration module likewise may not be reduced in size any further. In addition, the vibration module composed of the rotating motor and the eccentric element may generate vibrations in a single direction or a single plane only.

Therefore, how to design a vibration module to provide at least two vibration directions and which may achieve miniaturization of the vibration module is now an important subject worth discussing and solving.

BRIEF SUMMARY OF THE DISCLOSURE

To solve the problems of the prior art, a vibration module is provided, having a main axis passing through a center of the vibration module, including a fixed part and a first vibration part. The first vibration part is disposed within the fixed part, including a first moving member and a first driving assembly. The first driving assembly drives the first moving member to move along the main axis relative to the fixed part.

In one of the embodiments of the present disclosure, the first vibration part further includes a first elastic element disposed on a first side of the first moving member, the main axis passes through the first side. The first moving member is movably connected to the fixed part via the first elastic element. The first elastic element includes a first elastic element connecting portion fixedly connected to the first moving member, and the first elastic element connecting portion includes a connection strengthening portion. The connection strengthening portion extends in a direction that is not parallel to the main axis. The first driving assembly includes a first driving magnetic. The first elastic element, the first moving member and the first driving magnetic element partially overlap when observed along the main axis.

In one of the embodiments of the present disclosure, the vibration module further includes a plurality of first elastic elements electrically connected to the first driving assembly. The first driving assembly includes a first driving coil. The first elastic element, the first moving member and the first driving coil partially overlap when observed along the main axis. The first elastic element includes a first elastic element connecting portion. The first elastic element connecting portion is fixedly disposed on the first moving member, and the first elastic element connecting portion and the first driving coil overlap when observed along the main axis.

In one of the embodiments of the present disclosure, the first vibration part further includes a first circuit assembly electrically connected to the first driving assembly. The first circuit assembly is disposed on a second side of the first moving member opposite the first side. The first circuit assembly has a flexible structure, and the first moving member is movably connected to the fixed part via the first circuit element. Along the main axis, the elastic coefficient of the first elastic element is greater than the elastic coefficient of the first circuit assembly. The first moving member includes a receiving portion located on the second side. The receiving portion has a recessed structure to receive at least a portion of the flexible structure.

In one of the embodiments of the present disclosure, the first moving member includes a recess facing the first elastic element. The recess and the first elastic element at least not partially overlap when observed along the main axis. The first moving member further includes a shielding element disposed on a second side of the first moving member opposite the first side. The recess and the shielding element at least partially overlap when observed along the main axis.

In one of the embodiments of the present disclosure, the vibration module further includes a second vibration part disposed in the fixed part. The second vibration part includes a second moving member and a second driving assembly. The second driving assembly drives the second moving member to move in a direction that is not parallel to the main axis relative to the fixed part. A largest size of the first moving member on the main axis is larger than a largest size of the second moving member on the main axis when observed along a direction perpendicular to the main axis. The first vibration part further includes a first elastic element, and the first moving member is movably connected to the fixed part via the first elastic element. The second vibrating portion further includes a second elastic element, and the second moving member is movably connected to the fixed part via the second elastic element. The first elastic element and the second elastic element at least partially overlap when observed along a direction perpendicular to the main axis.

In one of the embodiments of the present disclosure, the first vibration part has a first natural resonance frequency, and the second vibration part has a second natural resonance frequency. The first natural resonance frequency is different from the second natural resonance frequency. The first vibration part further includes a first circuit assembly electrically connected to the first driving assembly, and the second vibration part further includes a second circuit assembly electrically connected to the second driving assembly. The first circuit assembly and the second circuit assembly at least partially overlap when observed along a direction perpendicular to the main axis. The first circuit assembly and the second circuit assembly at least partially overlap when observed along the main axis.

BRIEF DESCRIPTION OF THE DRAWINGS

The invention may be more fully understood by reading the subsequent detailed description and examples with references made to the accompanying drawings, wherein:

FIG. 3D shows a partial schematic view of the outer frame according to an embodiment of the present invention.

DETAILED DESCRIPTION OF THE DISCLOSURE

The making and using of vibration module of embodiments of the present disclosure are discussed in detail below. It should be appreciated, however, that the embodiments provide many applicable inventive concepts that may be embodied in a wide variety of specific contexts. The specific embodiments discussed are merely illustrative of specific ways to make and use the embodiments and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
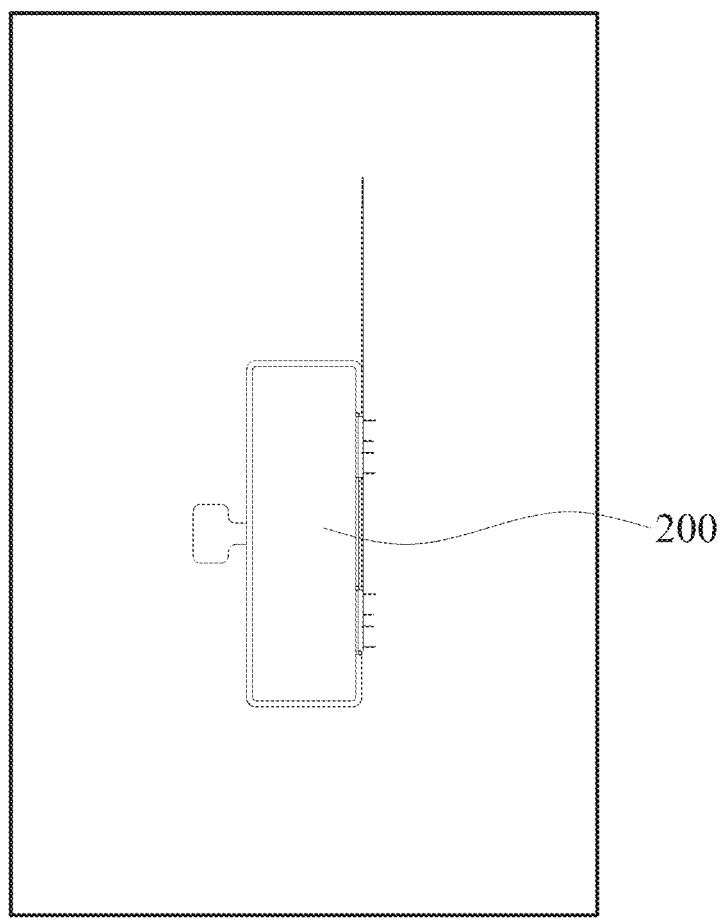
FIG. 1 shows an electronic device with a vibration module according to an embodiment of the present invention.

Firstly, please refer to FIG. 1, a vibration module 200 of an embodiment of the present invention may be mounted into an electronic device 2 within for generating vibrations. The electronic device 2 may be, for example, a smart phone or a tablet. When generating vibrations, the vibration module 200 may receive a current from the outside of the vibration module 200 and generates an electromagnetic driving force, the electromagnetic driving force may interact with a magnetic field and makes the vibration module 200 to vibrate, thereby the user of the electronic device 2 may feel the vibration. It should be noted that the relation in position and size between the vibration module 200 and the electronic device 2 shown in FIG. 1 is only an example, but not limiting the relation in position and size between the vibration module 200 and the electronic device 2. In fact, the vibration module 200 may be mounted at different positions in the electronic device 2 according to the different needs.

Figure 2A:
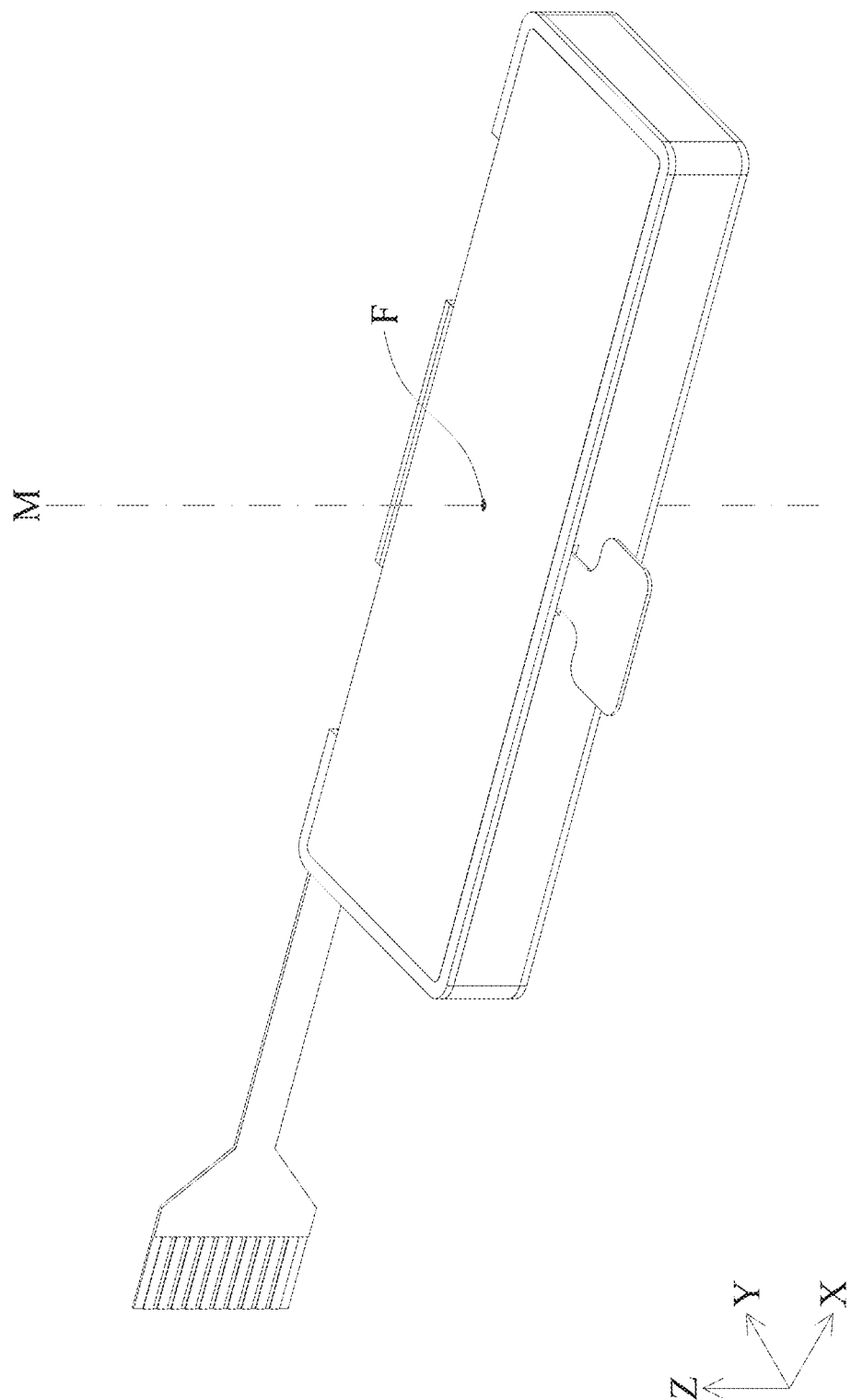
FIG. 2A shows a perspective view of the vibration module according to an embodiment of the present invention.
Figure 2B:
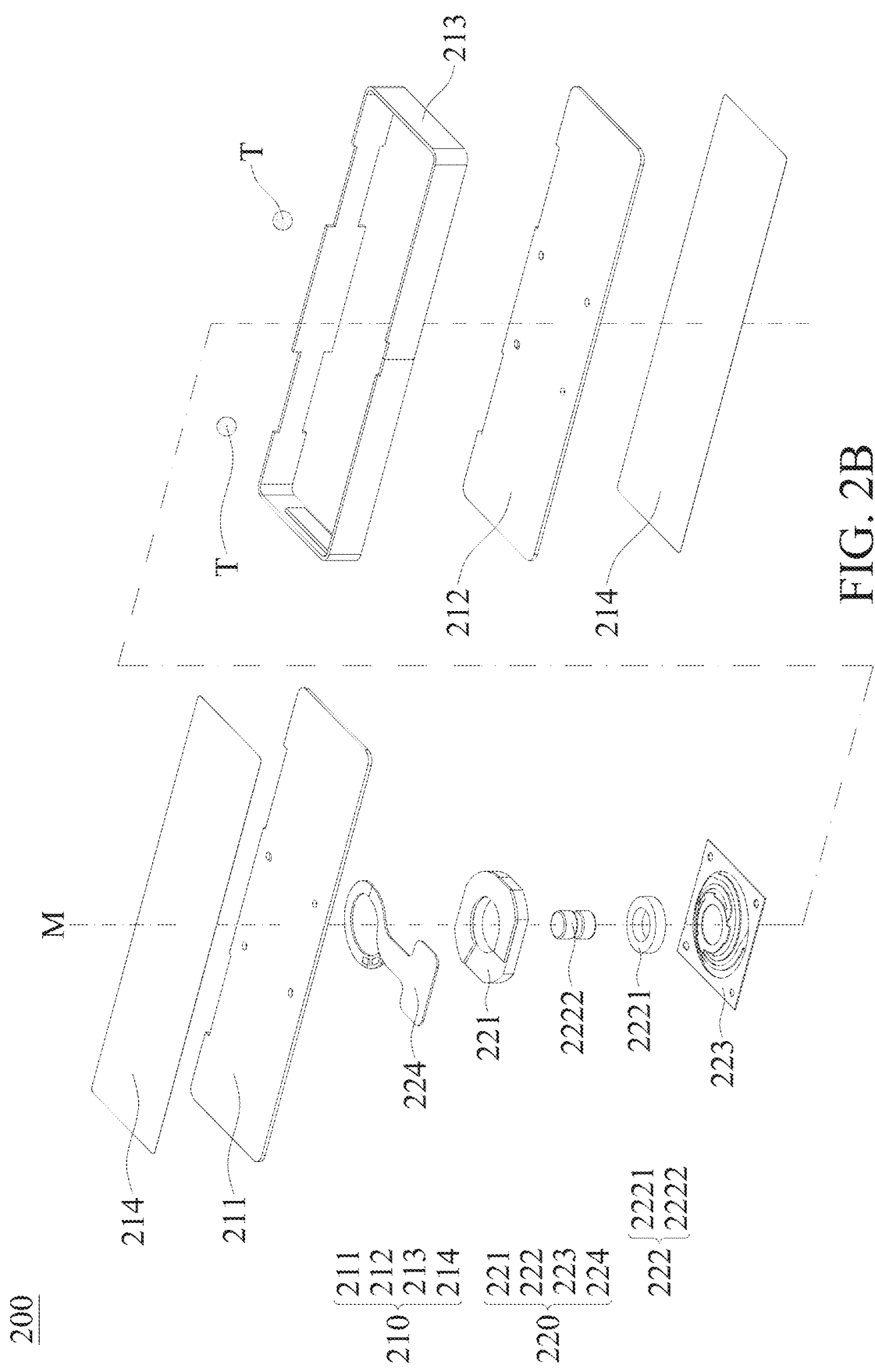
FIG. 2B shows an exploded view of the vibration module according to an embodiment of the present invention.

Please refer to FIG. 2A and FIG. 2B, FIG. 2A is a perspective view of the vibration module 200, and FIG. 2B is an exploded view of the vibration module 200. As shown in FIG. 2A, the vibration module 200 has a main axis M, the main axis M passes through a center F of the vibration module 200. As shown in FIG. 2B, the vibration module 200 includes a fixed part 210, a first vibration part 220 and a connecting member T. The fixed part 210 includes a top plate 211, a bottom plate 212, an outer frame 213 and two shielding elements 214. The first vibration part 220 includes a first moving member 221, a first driving assembly 222, a first elastic element 223, a first circuit assembly 224. The first driving assembly 222 includes a first driving coil 2221 and a first driving magnetic element 2222.

Figure 3A:
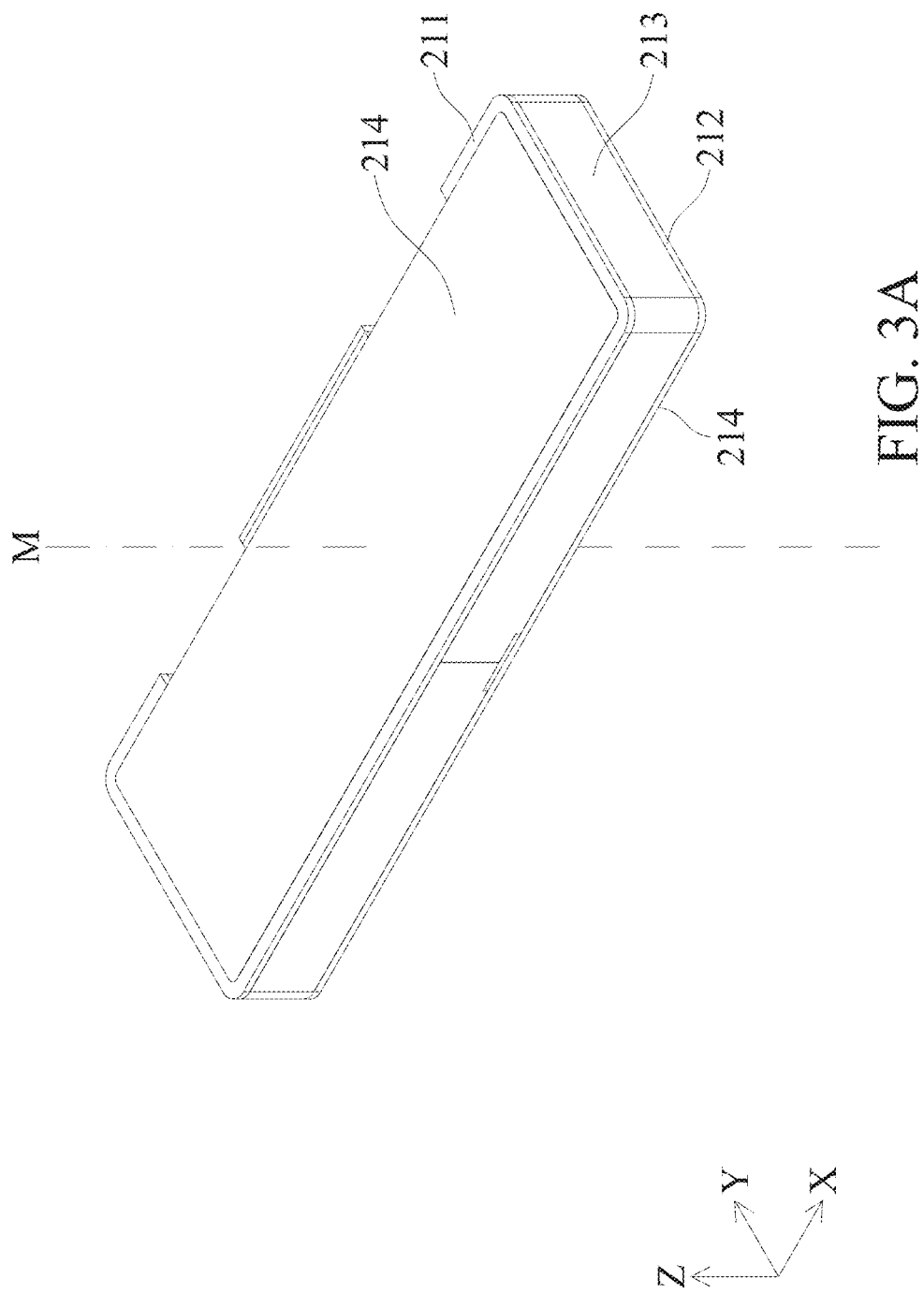
FIG. 3A shows a schematic view of a fixed part of the vibration module according to an embodiment of the present invention.
Figure 3B:
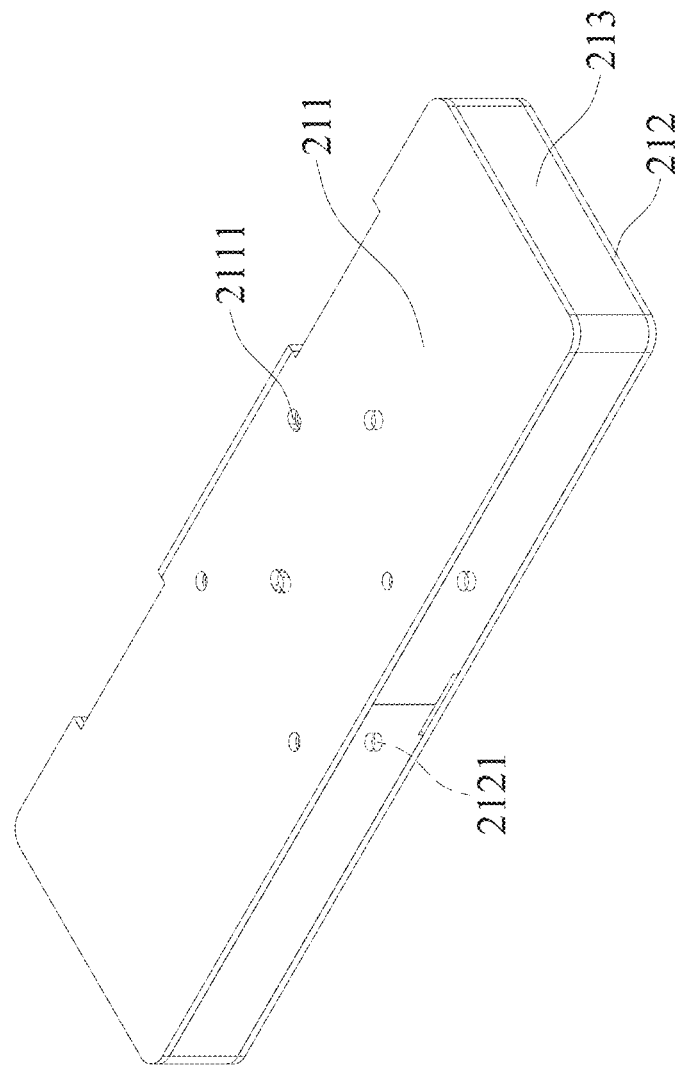
FIG. 3B shows a schematic view of a top plate, a bottom plate and an outer frame according to an embodiment of the present invention.

Please refer to FIG. 3A, FIG. 3A is a schematic view of the fixed part 210. The outer frame 213 is located between the top plate 211 and the bottom plate 212. The top plate 211 covers the upper portion of the outer frame 213, and the bottom plate 212 covers the lower portion of the outer frame 213. Therefore, the main axis M also passes through the top plate 211 and the bottom plate 212. The top plate 211, the bottom plate 212 and the outer frame 213 may be made of a non-ferromagnetic metal, and preferably the density of this non-ferromagnetic metal is greater than the density of a plastic material. Please refer to FIG. 3B, FIG. 3B is a schematic view of the top plate 211, the bottom plate 212 and the outer frame 213. The top plate 211 has a through hole 2111, and the bottom plate 212 has a through hole 2121, wherein the through hole 2121 is shown as a dashed line. The through hole 2111 and the through hole 2121 are helpful to position of the elements disposed in the vibration module 200 and the assembly of the vibration module 200.

Please refer to FIG. 3A again, the two shielding elements 214 are located above the top plate 211 and below the bottom plate 212, respectively. The shielding element 214 located above the top plate 211 covers the through hole 2111, and the shielding element 214 located below the bottom plate 212 covers the through hole 2121. That is, the shielding element 214 above the top plate 211 completely overlaps the through holes 2111, and the shielding element 214 below the bottom plate 212 completely overlaps the through holes 2121 when viewed along the main axis M. Thus, the through hole 2111 and the through hole 2121 are not exposed to the outside, and thus avoiding the external dust or water entering the vibration module 200 via the through holes 2111 or the through hole 2121, thereby achieving the effects of waterproof and dustproof. The shielding element 214 may be a shielding material such as a light-shielding sheet.

Figure 3C:
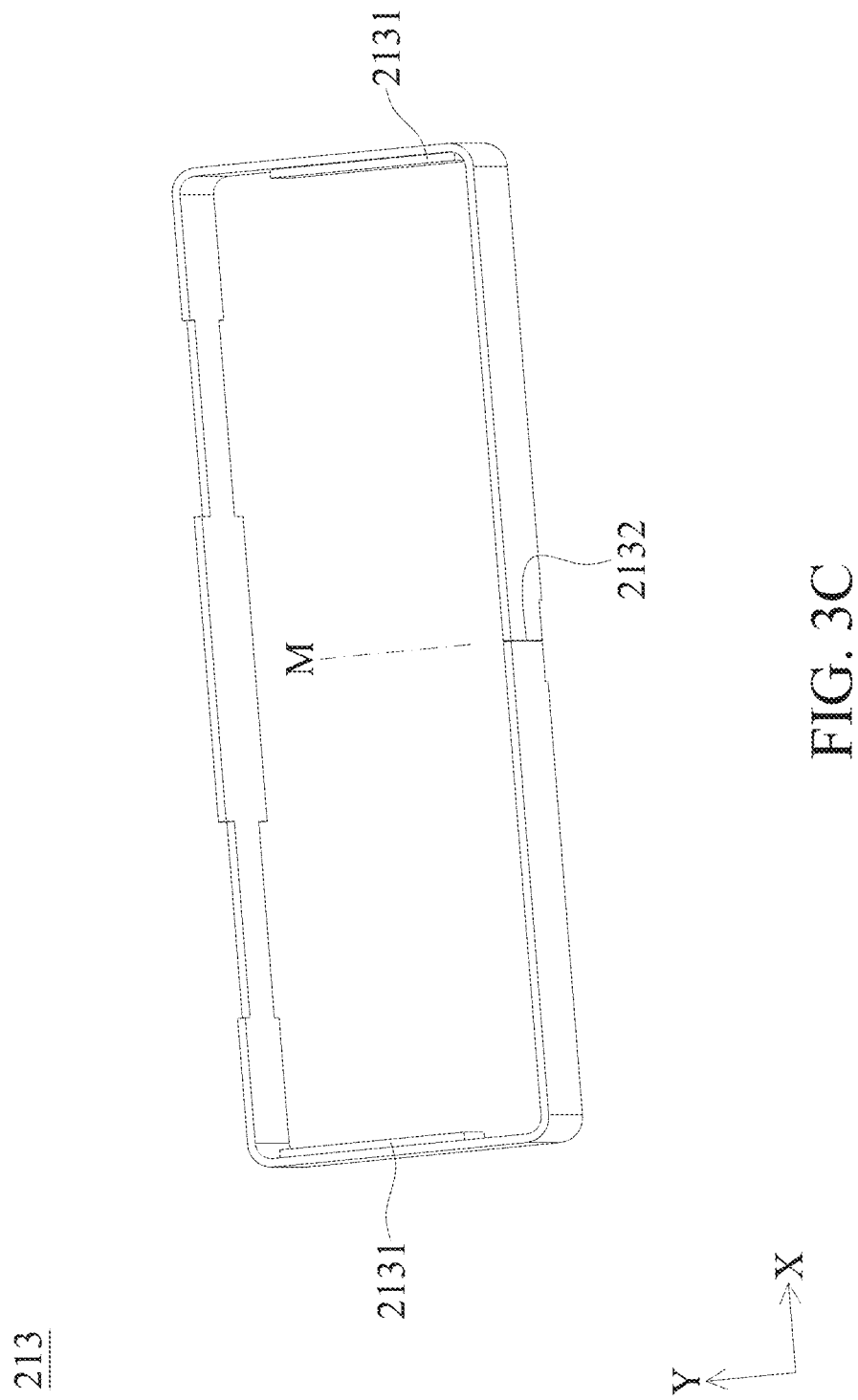
FIG. 3C shows a schematic view of the outer frame according to an embodiment of the present invention.

FIG. 3C is a schematic view of the outer frame 213, and FIG. 3D is a partial schematic view of the outer frame 213. As shown in FIG. 3C, the outer frame 213 is shaped centered on the main axis M, and the outer frame 213 includes two welding portions 2131 and a gap 2132. The welding portions 2131 are located on both sides of the outer frame 213, and extends along the outer frame 213. As shown in FIG. 3D, the gap 2132 of the outer frame 213 traverse the outer frame 213 along the main axis M. That is, the outer frame 213 is disconnected at the gap 2132 by the gap 2132, therefore, the outer frame 213 is not circumferentially connected to be an integrity, and a circuit board, plastic member, solder, or the light-shielding sheet may be used to shield the gap 2132 to prevent foreign matters from entering the vibration module 200. In fact, the outer frame 213 may be a metal sheet which is bent and shaped, rather than cast molding, by centering on the main axis M. Thus, the complexity in manufacturing the vibration module 200 may be reduced, thereby reducing the cost in manufacturing the vibration module 200.

Figure 4A:
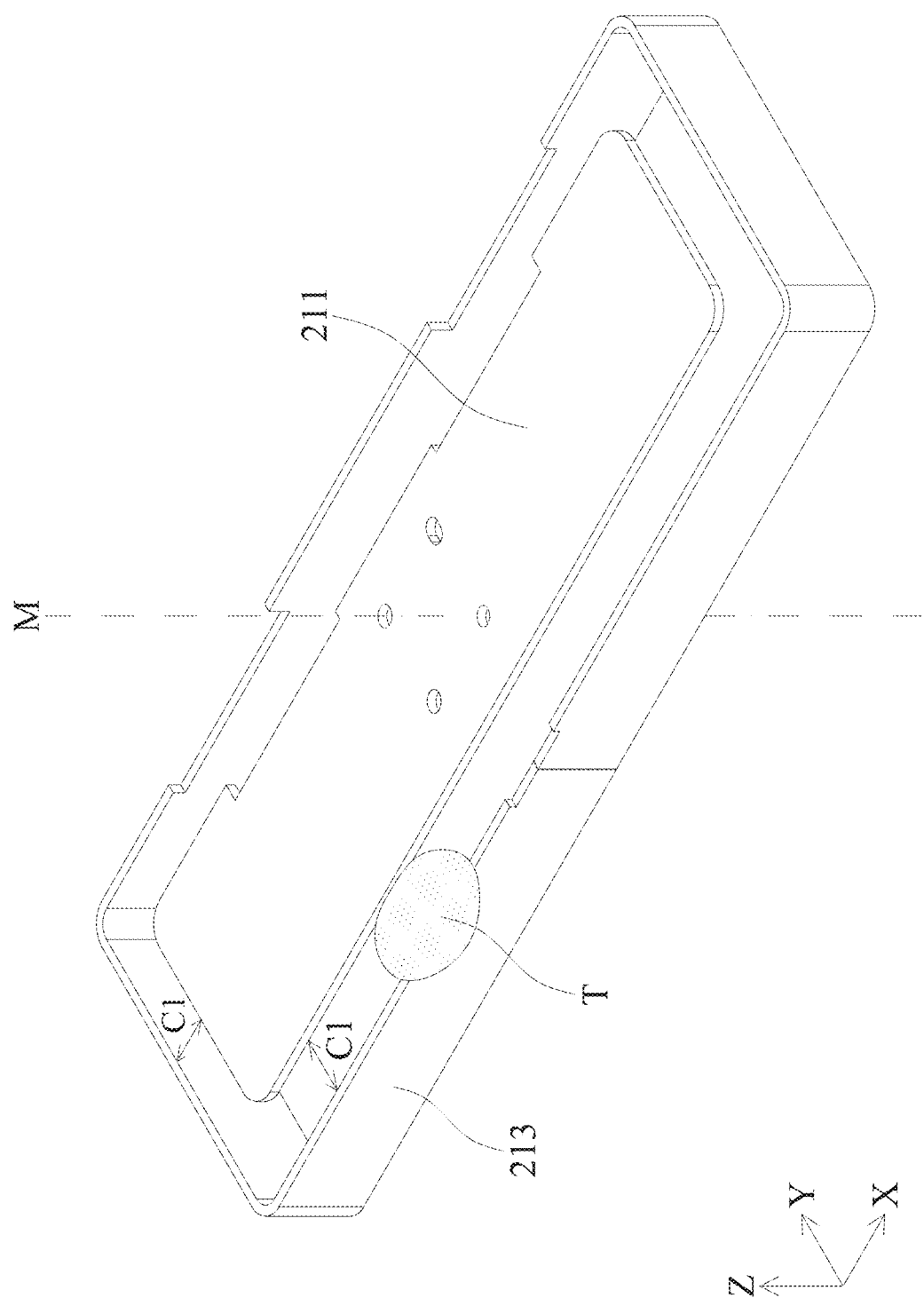
FIG. 4A shows a partial schematic view of the top plate and the outer frame according to an embodiment of the present invention.
Figure 4B:
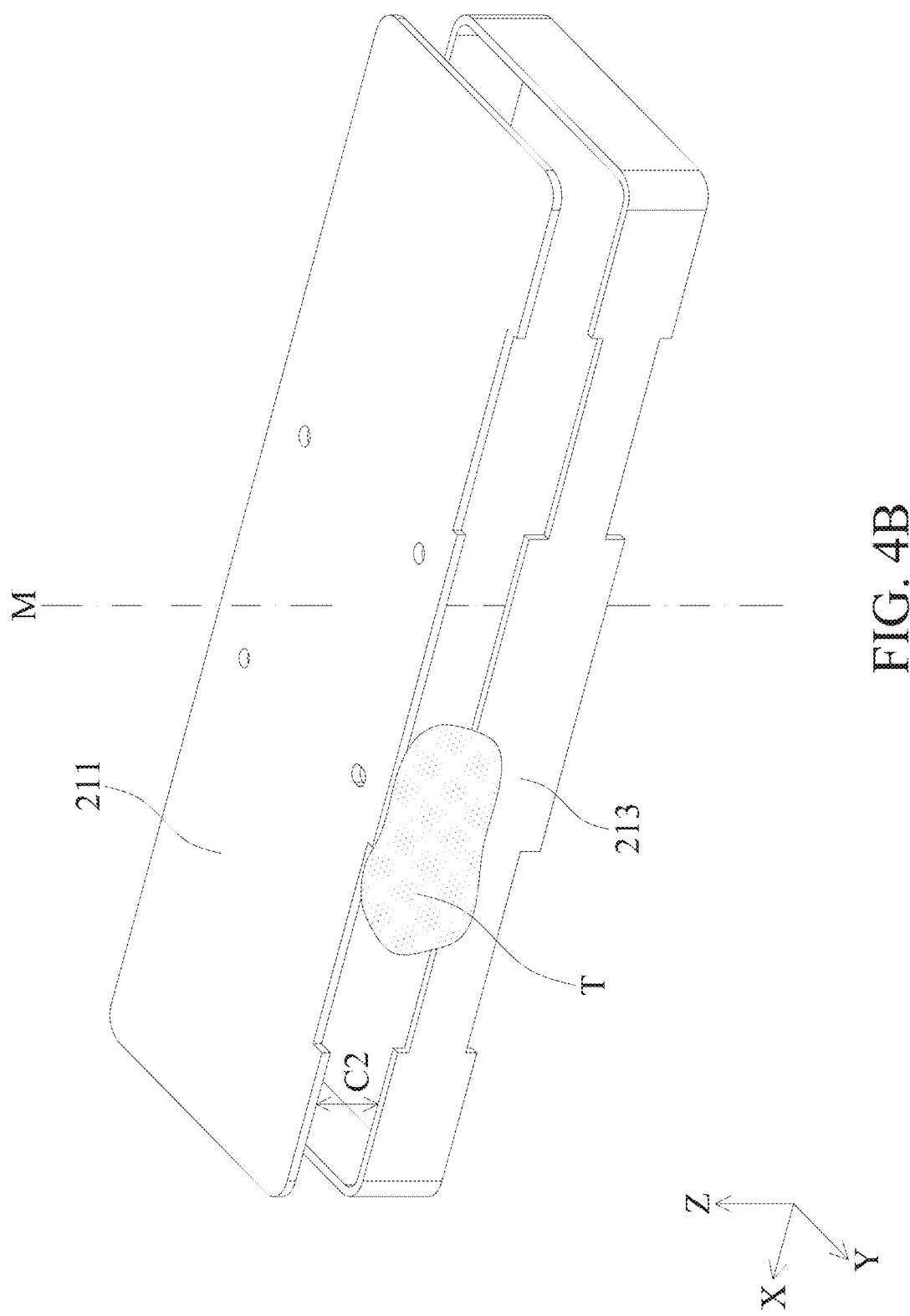
FIG. 4B shows a partial schematic view of the top plate and the outer frame according to another embodiment of the present invention.

FIG. 4A and FIG. 4B are partial schematic views of the top plate 211 and the outer frame 213 according to different embodiments. As shown in FIG. 4A, in one embodiment, the top plate 211 is not directly connected to the outer frame 213, and there is a gap C1 between the top plate 211 and the outer frame 213 when viewed along the main axis M. As shown in FIG. 4B, in another embodiment, the top plate 211 is not directly connected to the outer frame 213, and there is a gap C2 between the top plate 211 and the outer frame 213 when viewed in a direction perpendicular to the main axis M. As shown in FIG. 4A and FIG. 4B, the connecting member T is provided between the top plate 211 and the outer frame 213 to fix the top plate 211 to the outer frame 213. The connecting member T may be a light-shielding sheet, or a material such as solder or adhesive.

Figure 4C:
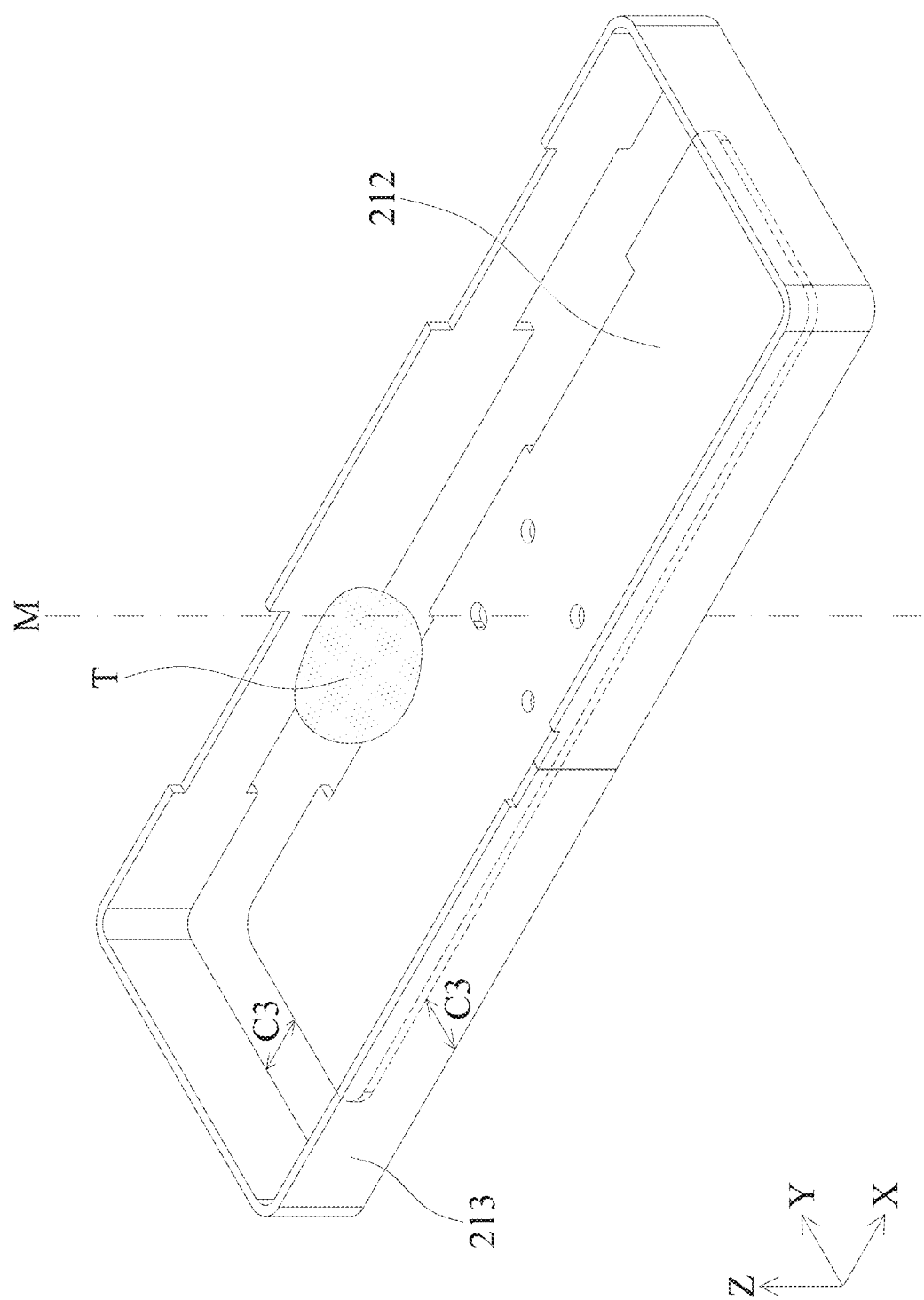
FIG. 4C shows a partial schematic view of the bottom plate and the outer frame according to an embodiment of the present invention.
Figure 4D:
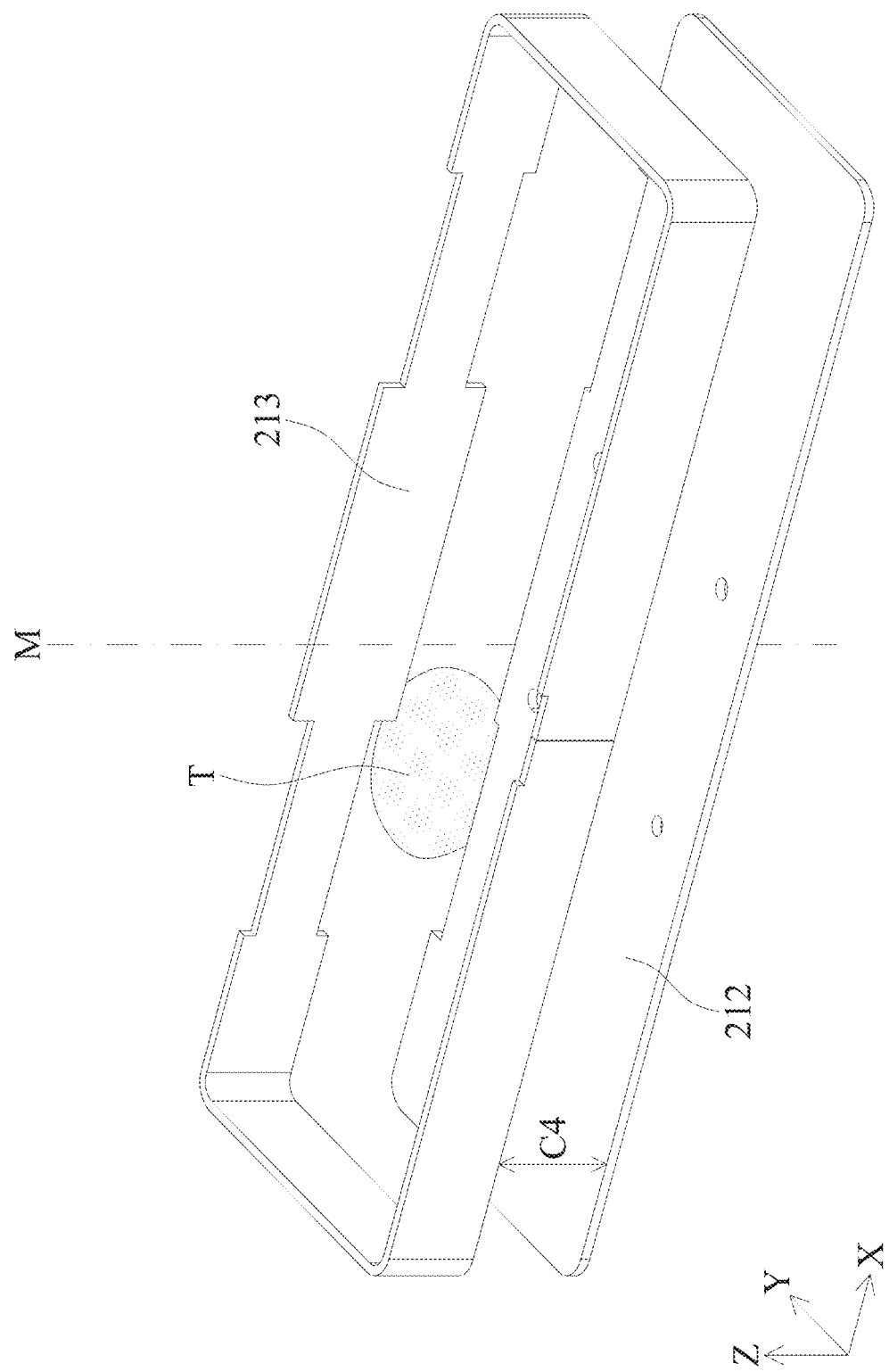
FIG. 4D shows a partial schematic view of the bottom plate and the outer frame according to another embodiment of the present invention.

FIG. 4C and FIG. 4D are partial schematic views of the bottom plate 212 and the outer frame 213 according to different embodiments. As shown in FIG. 4C, in one embodiment, the bottom plate 212 is not directly connected to the outer frame 213, and there is a gap C3 between the bottom plate 212 and the outer frame 213 when viewed along the main axis M. As shown in FIG. 4D, in another embodiment, the bottom plate 212 is not directly connected to the outer frame 213, and there is a gap C4 between the bottom plate 212 and the outer frame 213 when viewed in a direction perpendicular to the main axis M. As shown in FIG. 4C and FIG. 4D, the connecting member T is provided between the bottom plate 212 and the outer frame 213 to fix the bottom plate 212 to the outer frame 213. The connecting member T may be a light-shielding sheet, or a material such as solder or adhesive.

Figure 5:
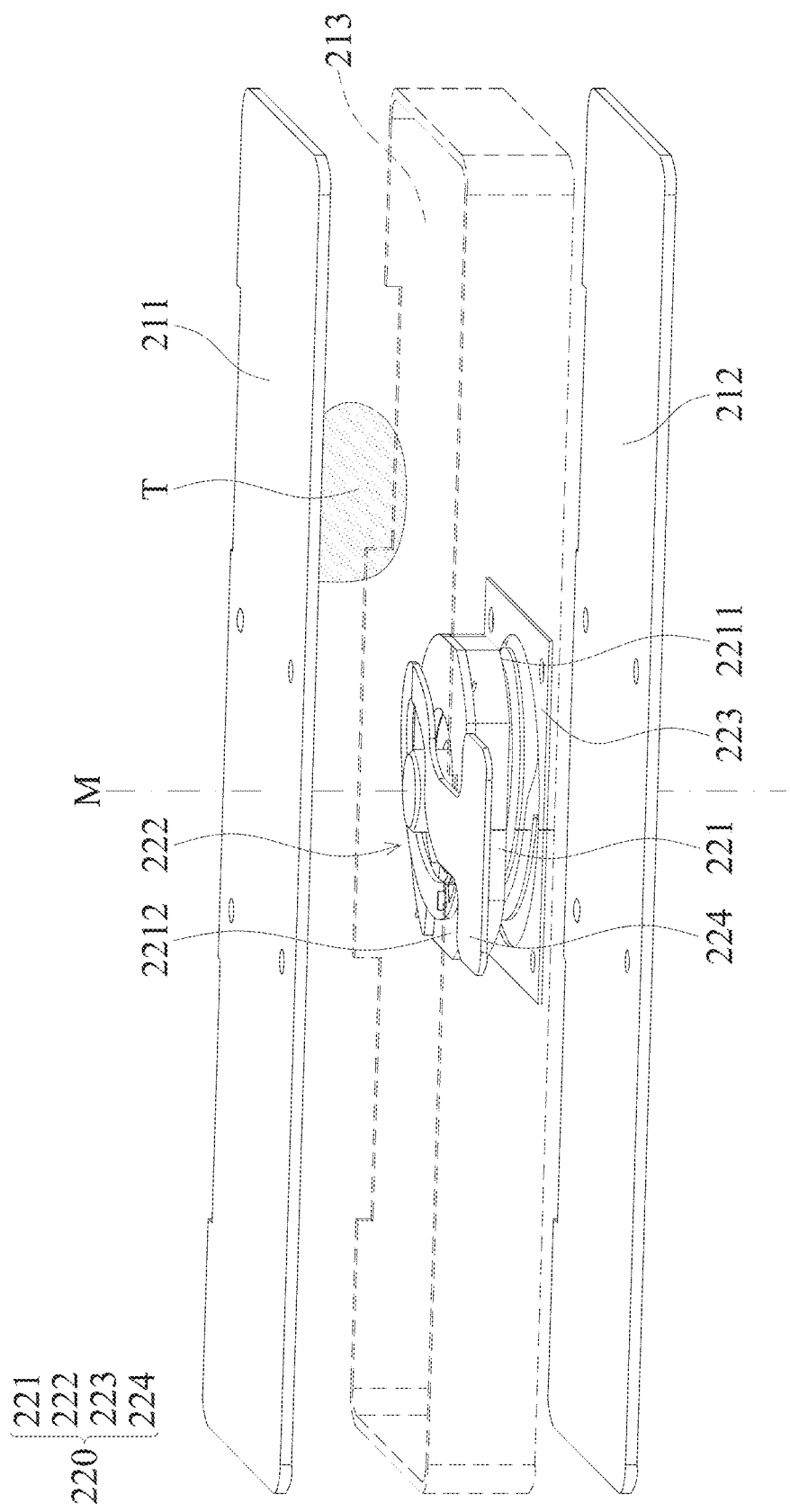
FIG. 5 shows a schematic view of the top plate, the bottom plate, the outer frame, and a first vibration part according to an embodiment of the present invention, wherein the outer frame is shown as a dashed line.

Please refer to FIG. 5, FIG. 5 is a schematic view of the top plate 211, the bottom plate 212, the outer frame 213, and the first vibration part 220, wherein the outer frame 213 is shown as a dashed line. As shown in FIG. 5, the first vibration part 220 is disposed at the top plate 211 and the bottom plate 212 of the fixed part 210. In one embodiment, the first moving member 221 may has a pie shape, however, the shape of the first moving member 221 may be adjusted according to actual needs. The first driving assembly 222 drives the first moving member 221 to move relative to the fixed part 210 along the main axis M. The first elastic element 223 is disposed on a first side 2211 of the first moving member 221, and the first moving member 221 is movably connected to the bottom plate 212 of the fixed part 210 via the first elastic element 223. A second side 2212 of the first moving member 221 opposite the first side 2211 is provided with a first circuit assembly 224. The main axis M passes through the first moving member 221, therefore, the main axis M passes through the first side 2211 and the second side 2212. The first circuit assembly 224 is connected to the first moving member 221 by welding or adhering, and the first circuit assembly 224 is connected to the top plate 211 and the frame 213 via the connecting member T (the connecting member T herein may be a solder or fixing materials such as glue). In other words, the first moving member 221 is connected to the top plate 211 and the outer frame 213 of the fixed part 210 via the first circuit assembly 224. The first circuit assembly 224 has a flexible structure, so that the first circuit assembly 224 will not break when the first moving member 221 moves. Along the main axis M, the elastic coefficient of the first elastic element 223 is greater than that of the first circuit assembly 224.

Figure 6A:
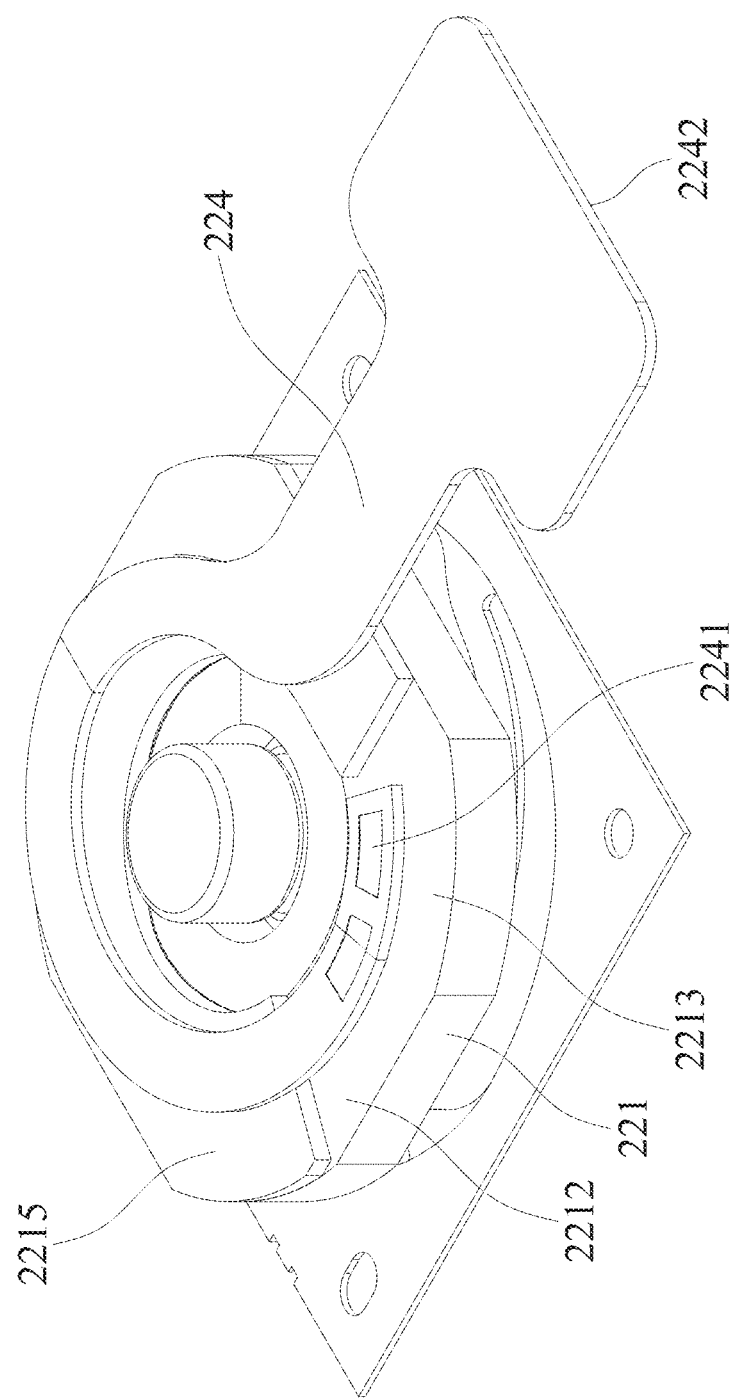
FIG. 6A shows a schematic view of a first moving member, and a first circuit assembly according to an embodiment of the present invention.
Figure 6B:
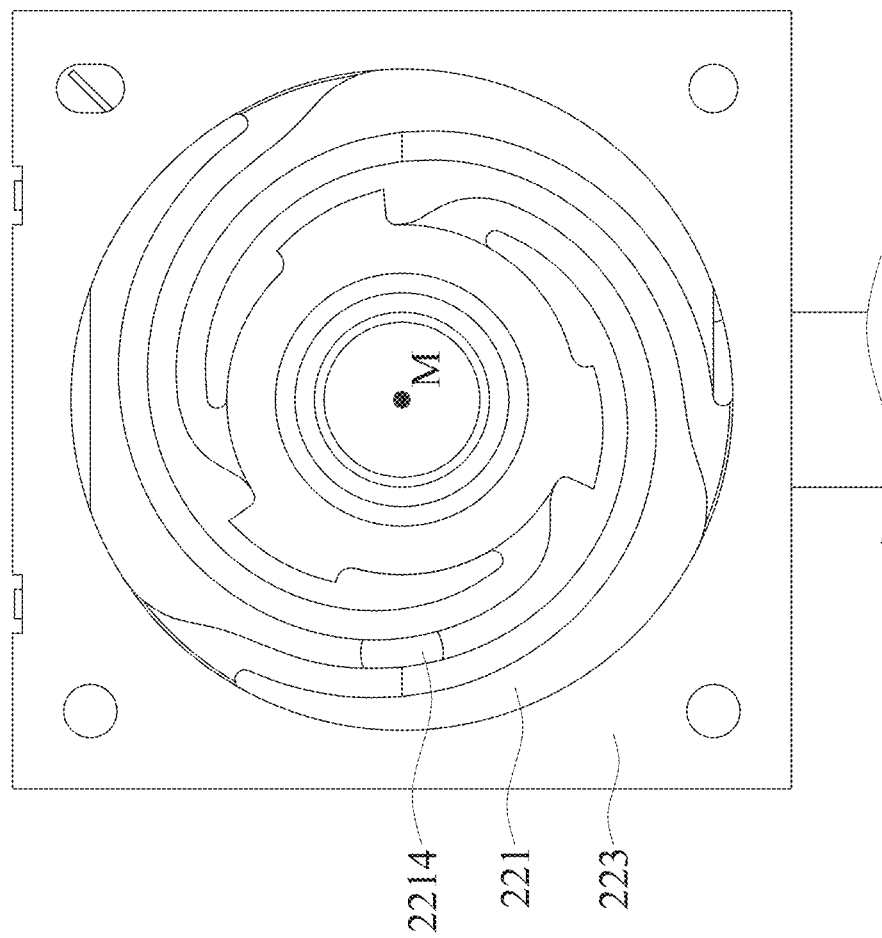
FIG. 6B shows a schematic view of the first moving member, and a first elastic element according to an embodiment of the present invention.
Figure 6C:
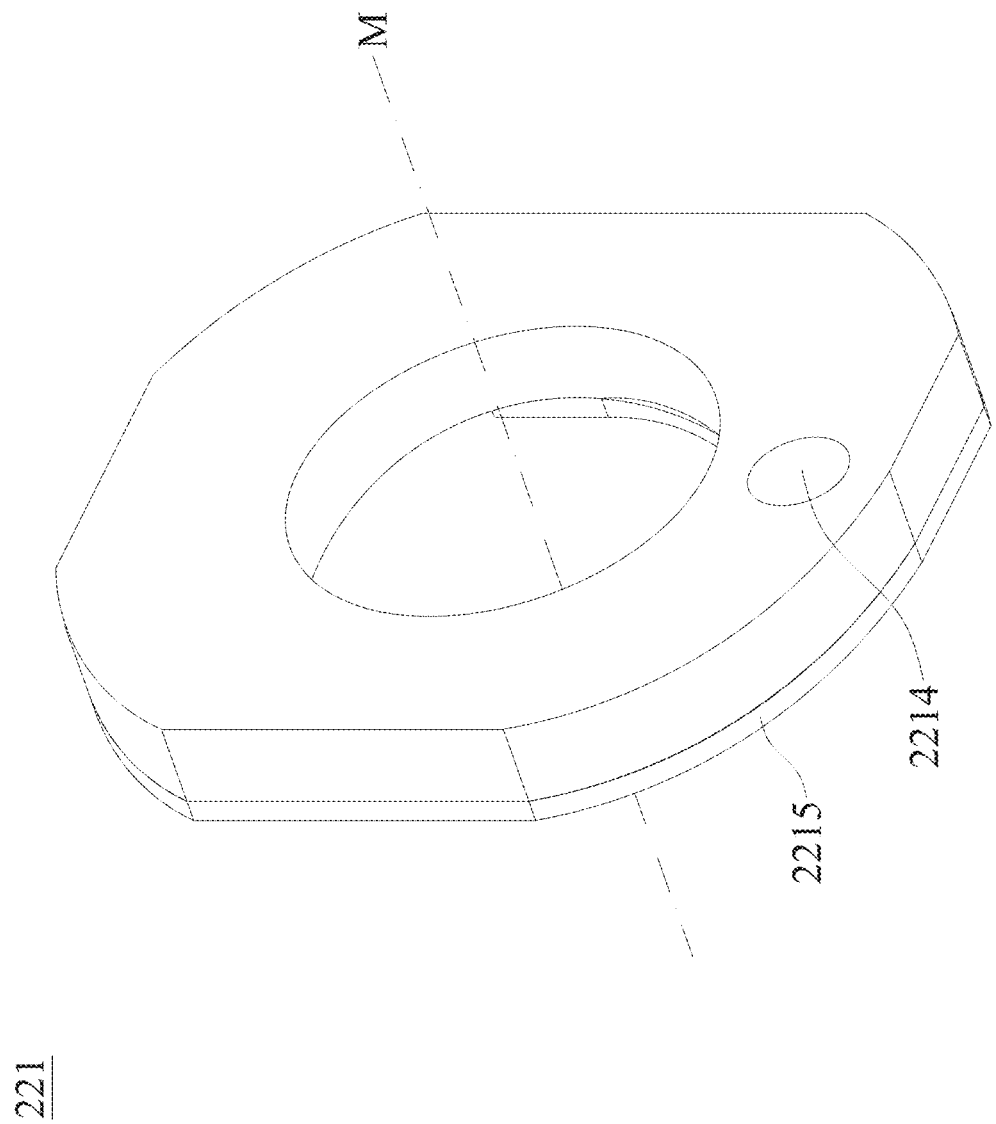
FIG. 6C shows a schematic view of the first moving member according to an embodiment of the present invention.

Please refer to FIG. 6A, FIG. 6B and FIG. 6C. FIG. 6A is a schematic view of the first moving member 221 and the first circuit assembly 224, FIG. 6B is a bottom view of the first moving member 221 and the first elastic element 223, and FIG. 6C is a schematic view of the first moving member 221. The first moving member 221 includes a receiving portion 2213, a recess 2214, and a shielding element 2215. As shown in FIG. 6A, the first circuit assembly 224 has a semi-spiral shape spiraling along the main axis, and the first circuit assembly 224 has an internal electrical connection portion 2241 and an external electrical connection portion 2242. The internal electrical connection portion 2241 is located at a spiral end of the first circuit assembly 224 of and is disposed in the receiving portion 2213, while the external electrical connection portion 2242 is located at a non-spiral end of the first circuit assembly 224. It should be noted that, since the first circuit assembly 224 is spiral along the main axis, the internal electrical connection portion 2241 and the external electrical connection portion 2242 are located on different planes. The receiving portion 2213 is located on the second side 2212 of the first moving member 221, and the receiving portion 2213 has a recessed structure to receive at least a portion of the first circuit assembly 224, i.e., the recessed structure receives at least a portion of the flexible structure of the first circuit assembly 224. The shielding element 2215 is disposed on the second side 2212 of the first moving member 221, and a part of the first circuit assembly 224 is disposed on the shielding element 2215. As shown in FIG. 6B, the recess 2214 faces the first elastic element 223. In the embodiment shown in FIG. 6B, the first elastic element 223 may have a palisade shape, therefore, the recess 2214 and the first elastic element 223 at least not partially overlap when observed along the main axis M. The size of the recess 2214 may be adjusted to adjust the weight configuration of the first moving member 221, such that the first moving member 221 is more stable. As shown in FIG. 6C, the recess 2214 corresponds to the shielding element 2215. That is, the recess 2214 at least partially overlaps the shielding element 2215 when observed along the main axis M. Thus, the weight configuration of the first moving member 221 may be adjusted, such that the first moving member 221 is more stable.

Figure 7A:
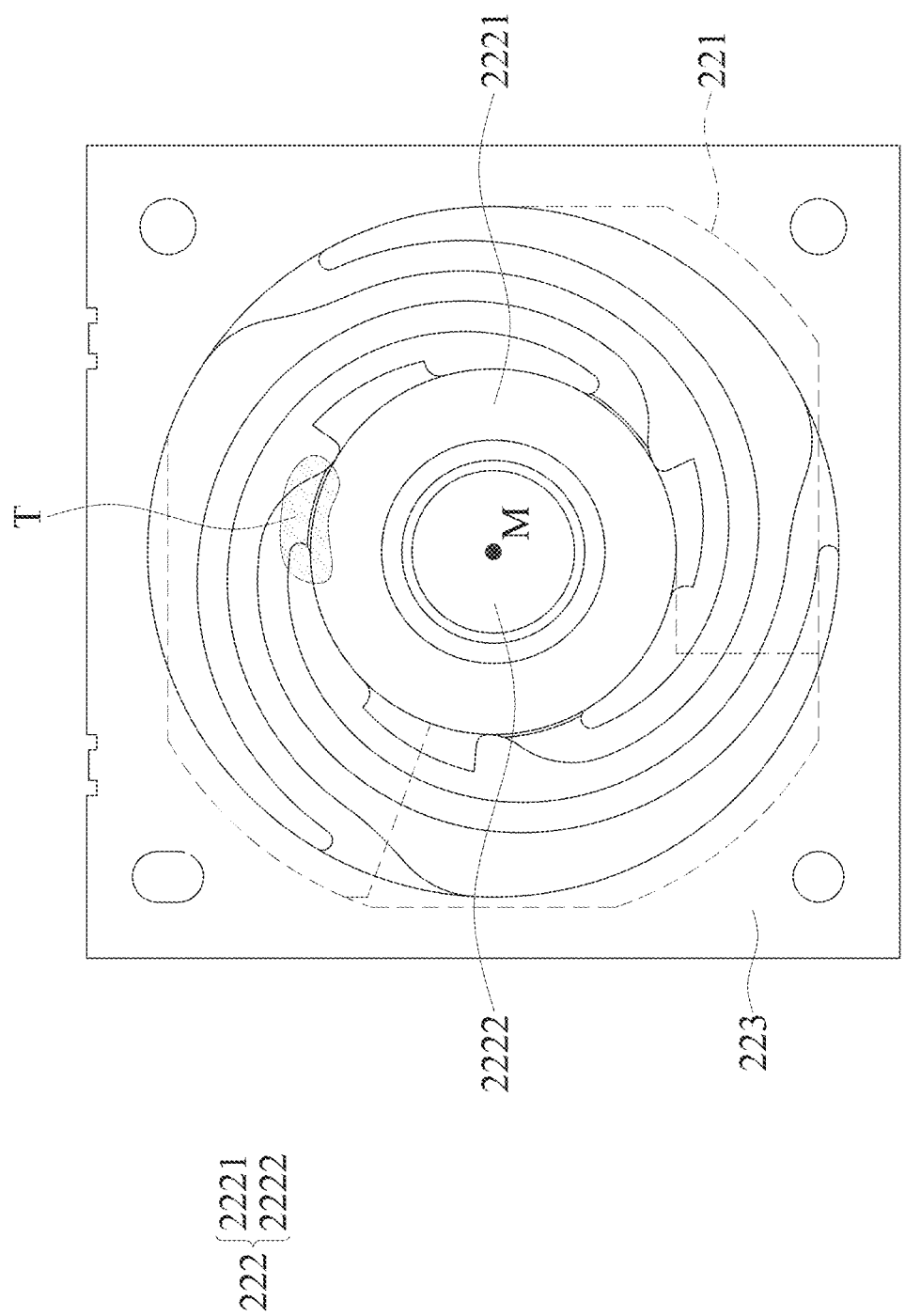
FIG. 7A shows a top view of the first moving member, a first driving assembly, and a first elastic element according to an embodiment of the present invention, wherein the first moving member is shown as a dashed line.

Please refer to FIG. 7A, FIG. 7A is a top view of the first moving member 221, the first driving assembly 222, and the first elastic element 223 according to an embodiment, wherein the first moving member 221 is shown as a dashed line. The first driving coil 2221 is fixedly connected to the first moving member 221 via the connecting member T, and the first moving member 221 and the first driving coil 2221 may be connected to the first elastic element 223 by welding. The first driving magnetic element 2222 may include two permanent magnets, and the like poles of the two permanent magnets face each other. That is, when the north-seeking pole of one of the permanent magnets faces downward, the south-seeking pole of the other permanent magnet faces upward, and vice versa. Thus, the magnetic fields of the two permanent magnets of the first magnetic driving assembly 2222 may effectively extends to the first driving coil 2221. Therefore, the first driving coil 2221 may interact with the magnetic fields of the two permanent magnets to generate an electromagnetic driving force after receiving the external current, thereby driving the first moving member 221 to move relative to the fixed part 210. The center of mass of the vibration module 200 is shifted when the first moving member 221 moves relative to the fixed part 210, thereby causing the user of the electronic device 2 to feel the vibration. As shown in FIG. 7A, in this embodiment, the first moving member 221, the first driving coil 2221 and the first elastic member 223 partially overlap when observed along the main axis M.

Figure 7B:
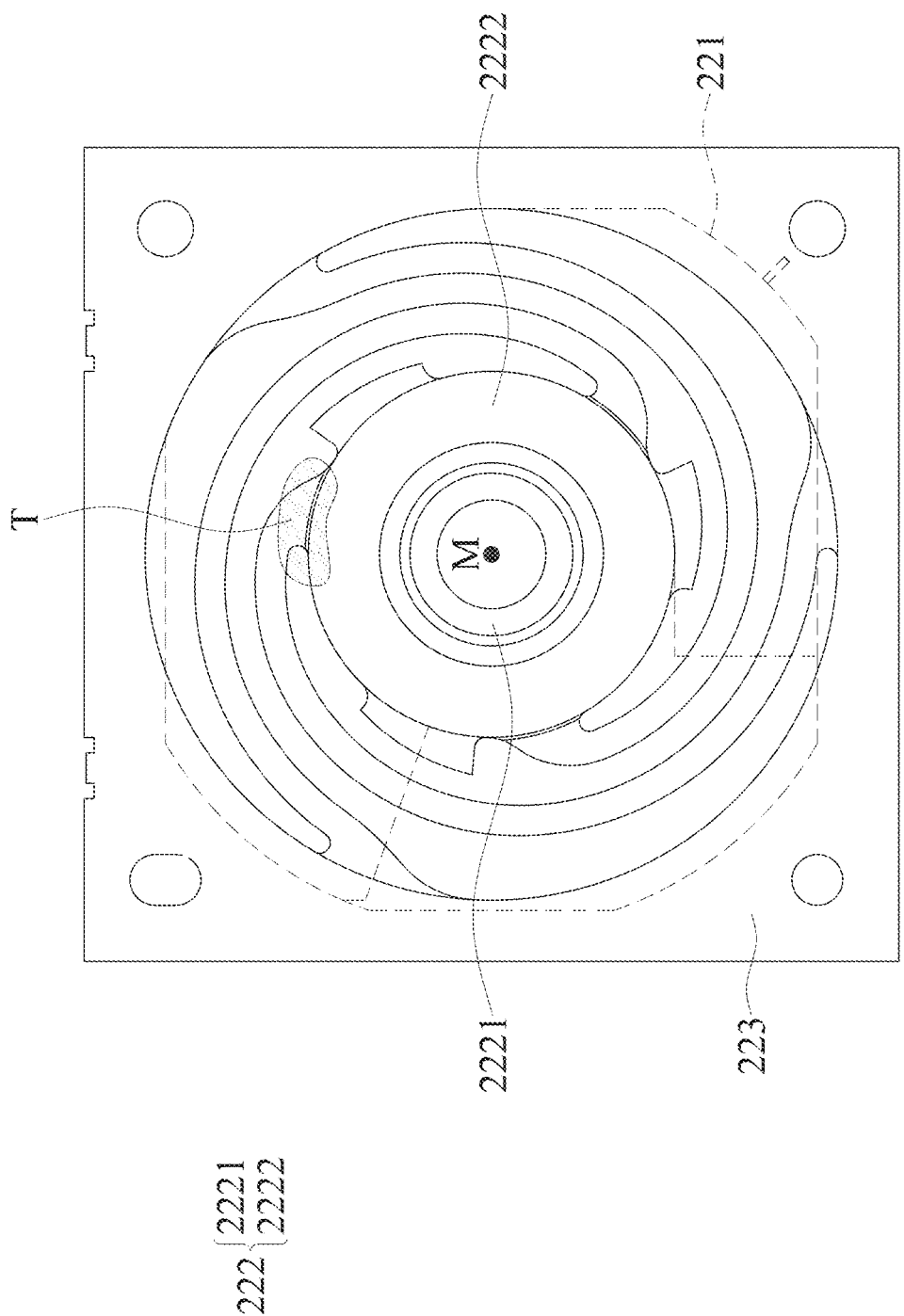
FIG. 7B shows a top view of the first moving member, a first driving assembly, and a first elastic element according to an embodiment of the present invention, wherein the first moving member is shown as a dashed line.

Please refer to FIG. 7B, FIG. 7B is a top view of the first moving member 221, the first driving assembly 222, and the first elastic element 223 according to an embodiment, wherein the first moving member 221 is shown as a dashed line. The embodiment shown in FIG. 7B is substantially the same as the embodiment shown in FIG. 7A, and the main difference is that, in the embodiment shown in FIG. 7B, the position of the first driving coil 2221 and the position of the first driving magnetic element 2222 are exchanged. The first driving magnetic element 2222 is fixedly connected to the first moving member 221 via the connecting member T. Therefore, the first moving member 221, the first driving magnetic element 2222, and the first elastic element 223 partially overlap when observed along the main axis M.

Figure 8A:
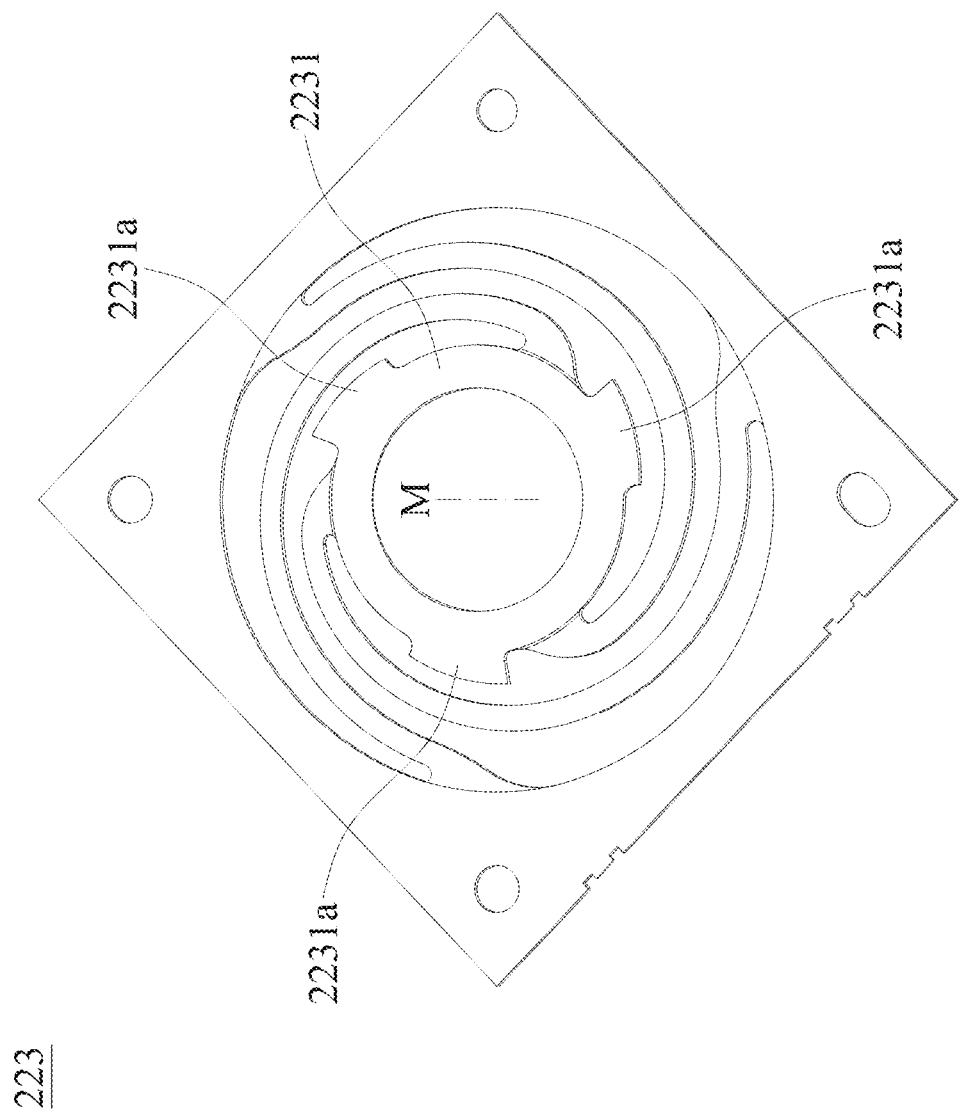
FIG. 8A shows a schematic view of the first elastic element according to an embodiment of the present invention.

Please refer to FIG. 8A, FIG. 8A is a schematic view of the first elastic element 223. The first elastic element 223 includes a first elastic element connecting portion 2231, and the first elastic element connecting portion 2231 includes three connection strengthening portions 2231a. The connection strengthening portions 2231a extend in a direction that is not parallel to the main axis M. It should be noted that, in other embodiments, the number of the connection strengthening portions 2231a is not limited to three.

Figure 8B:
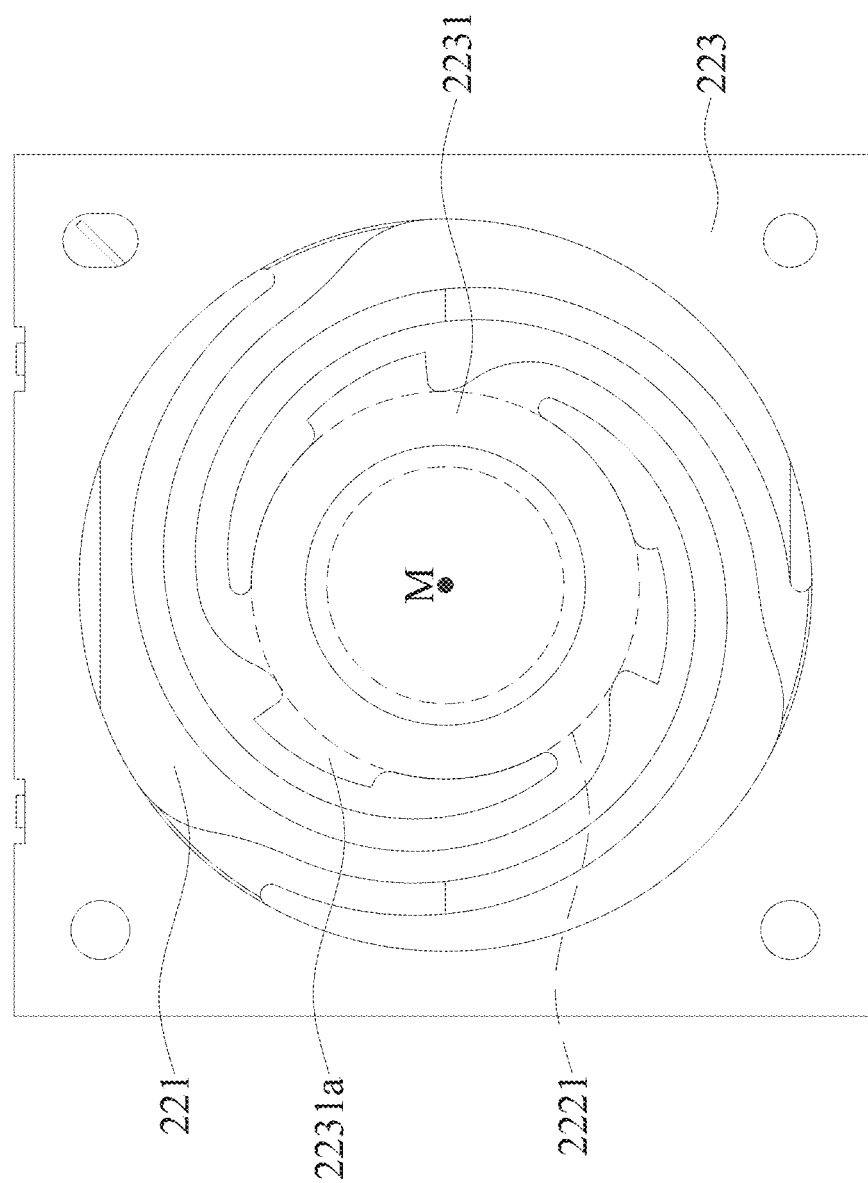
FIG. 8B shows a bottom view of the first moving member, a first driving coil, and the first elastic element according to an embodiment of the present invention, wherein the first driving coil is shown as a dashed line.

Please refer to FIG. 8B, FIG. 8B is a bottom view of the first moving member 221, the first driving coil 2221, and the first elastic element 223, wherein the first driving coil 2221 is shown as a dashed line. The first elastic element connecting portion 2231 may be fixedly connected to the first moving member 221 and the first driving coil 2221 by welding. Therefore, the first elastic element connecting portion 2231 and the first driving coil 2221 at least not partially overlap when observed along the main axis M. The connection strengthening portions 2231a may increase the connecting area between the first elastic element connecting portion 2231 and the first moving member 221, so as to enhance the connecting strength of the first elastic element 223 and the first moving member 221.

Figure 8C:
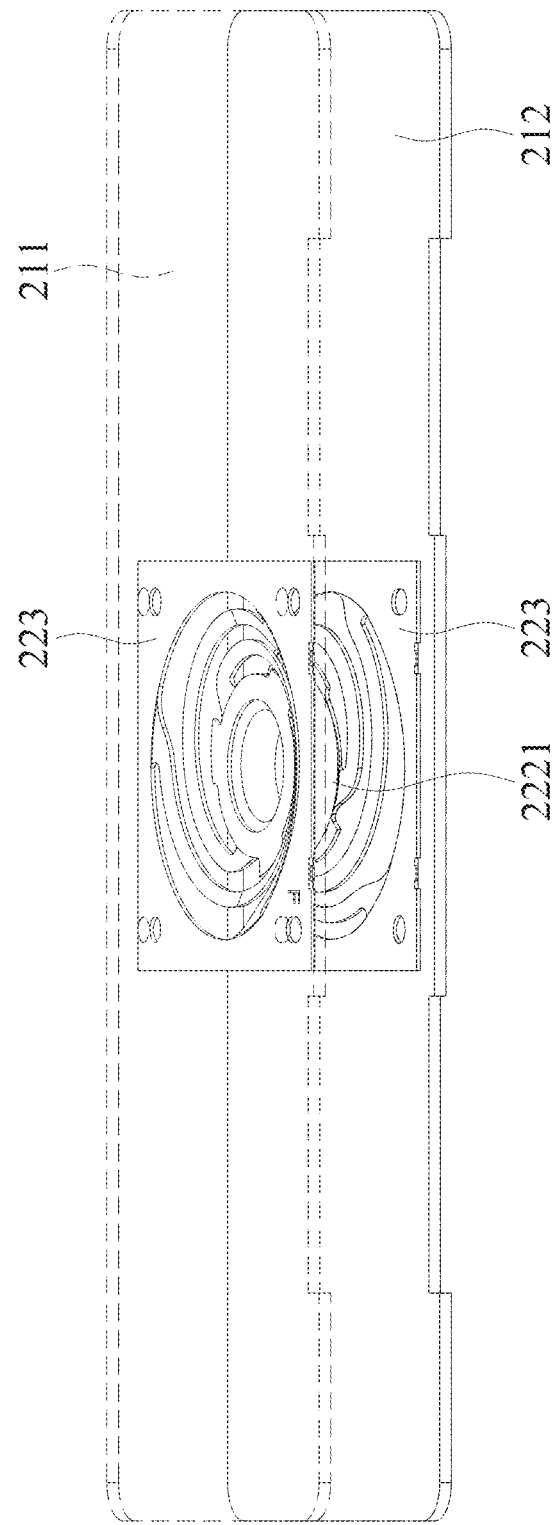
FIG. 8C shows a side view of the top plate, the bottom plate, and the first vibration part according to an embodiment of the present invention.

Please refer to FIG. 8C, FIG. 8C is a side view of the top plate 211, the bottom plate 212, and the first vibration part 220. In this embodiment, the first vibrating part 220 has two first elastic elements 223, and the two first elastic elements 223 are respectively connected to the top plate 211 and the bottom plate 212. The two first elastic elements 223 are both electrically connected to the first driving coil 2221. Therefore, in this embodiment, the two first elastic elements 223 supply external current to the first driving coil 2221 to generate the electromagnetic driving force.

Figure 9:
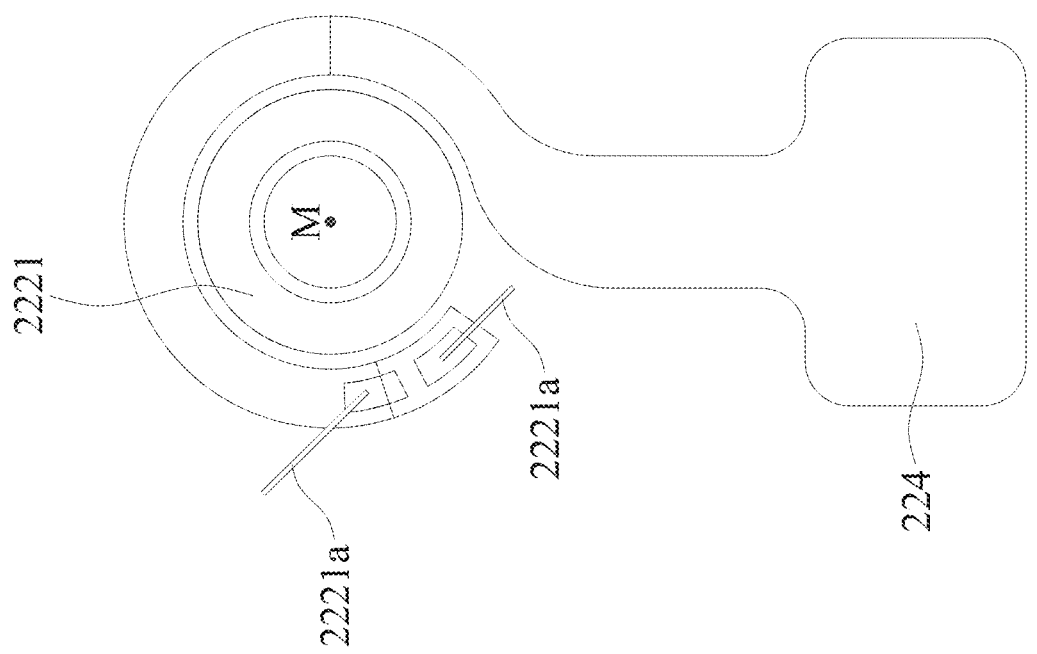
FIG. 9 shows a schematic view of the first driving coil, and the first circuit assembly according to an embodiment of the present invention.

FIG. 9 is a schematic view of the first driving coil 2221, and the first circuit assembly 224. The first driving coil 2221 of the first driving assembly 222 is electrically connected to the first circuit assembly 224 via two wires 2221a of the first driving coil 2221. Therefore, in the embodiment shown in FIG. 9, the first circuit assembly 224 supplies external current to the first driving coil 2221 to generate the electromagnetic driving force.

Figure 10A:
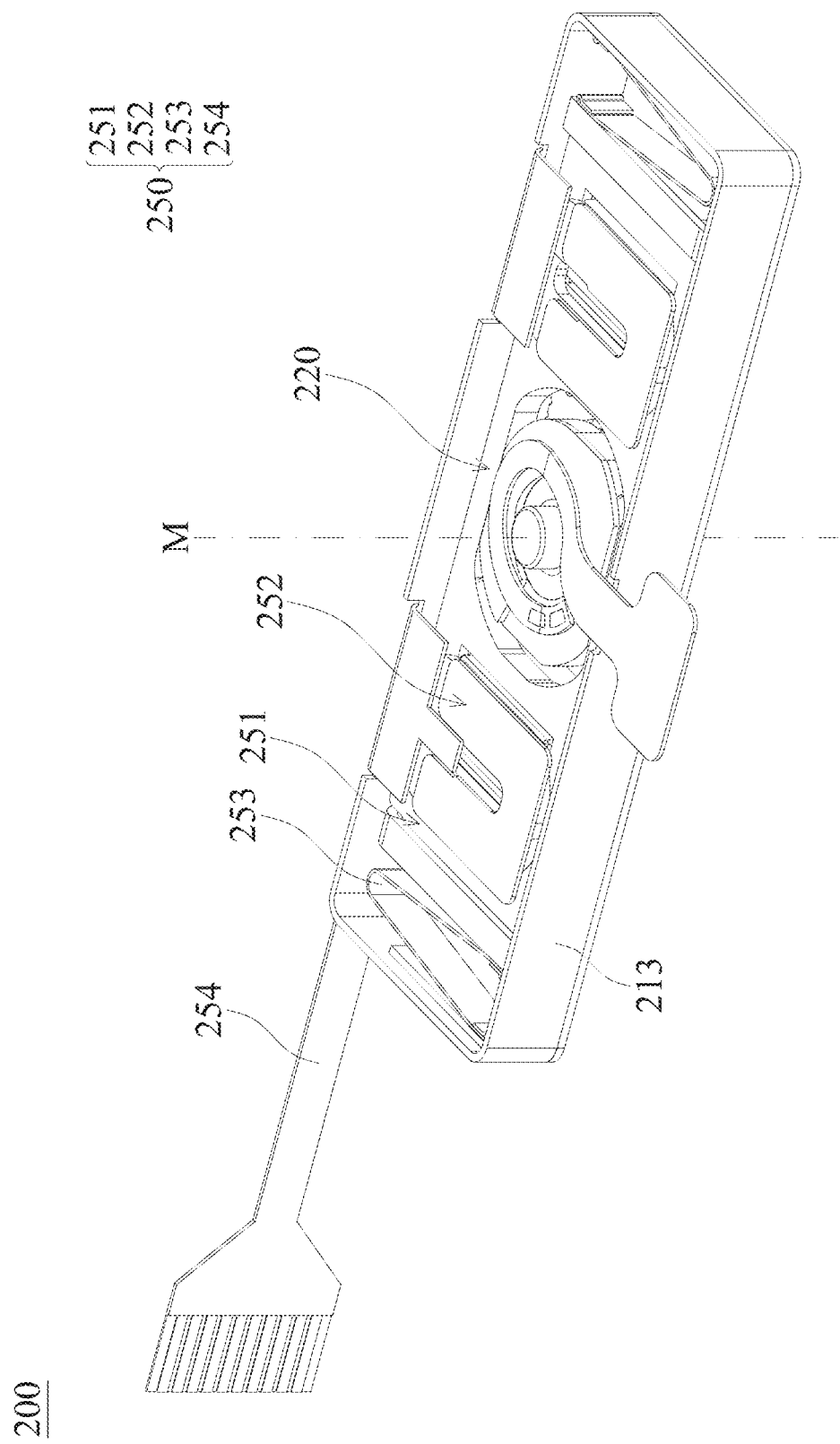
FIG. 10A shows a schematic view of the vibration module according to an embodiment of the present invention, wherein the top plate and the shielding element are omitted.

FIG. 10A is a schematic view of the vibration module 200 according to an embodiment, wherein the top plate 211 and the shielding element 214 are omitted. As shown in FIG. 10A, in an embodiment of the present invention, the vibration module 200 further includes a second vibration part 250. The second vibration part 250 is disposed within the outer frame 213 of the fixed part 210. The second vibration part 250 includes a second moving member 251, a second driving assembly 252, a second elastic element 253, and a second circuit element 254. The first vibration part 220 has a first natural resonance frequency, and the second vibration part 250 has a second natural resonance frequency, and the second natural resonance frequency is different from the first natural resonance frequency. The second driving assembly 252 drives the second moving member 251 to move relative to the fixed part 210 in the direction that is not parallel to the main axis M. The second moving member 251 is movably connected to the outer frame 213 of the fixed part 210 via the second elastic element 253. The second circuit assembly 254 is electrically connected to the second driving assembly 252 to supply the external current to the second driving assembly 252, thereby driving the second moving member 251 to move.

Figure 10B:
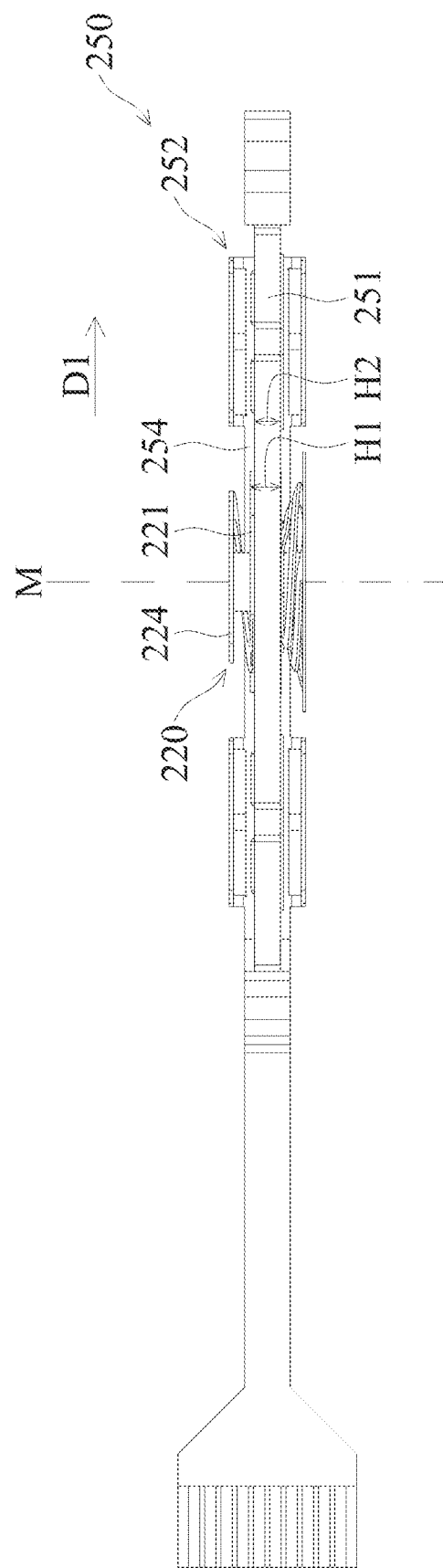
FIG. 10B is a side view of the first vibration part and a second vibration part according to the same embodiment as FIG. 10A.

FIG. 10B is a side view of the first vibration part 220 and the second vibration part 250 according to the same embodiment as FIG. 10A. As shown in FIG. 10B, a largest size H1 of the first moving member 221 on the main axis M is larger than a largest size H2 of the second moving member 251 on the main axis M when observed along a direction perpendicular to the main axis. That is, the largest size H2 of the second moving member 251 on the main axis M is smaller than the largest size H1 of the first moving member 221 on the main axis M. Thus, the size and the weight of the second moving member 251 may be reduced, and the effect of miniaturization is achieved. The second circuit assembly 254 extends in a first direction D1 to supply the external current to the second driving assembly 252. Therefore, the first circuit assembly 224 and the second circuit assembly 254 at least partially overlap when observed along the direction perpendicular to the main axis M.

Figure 10C:
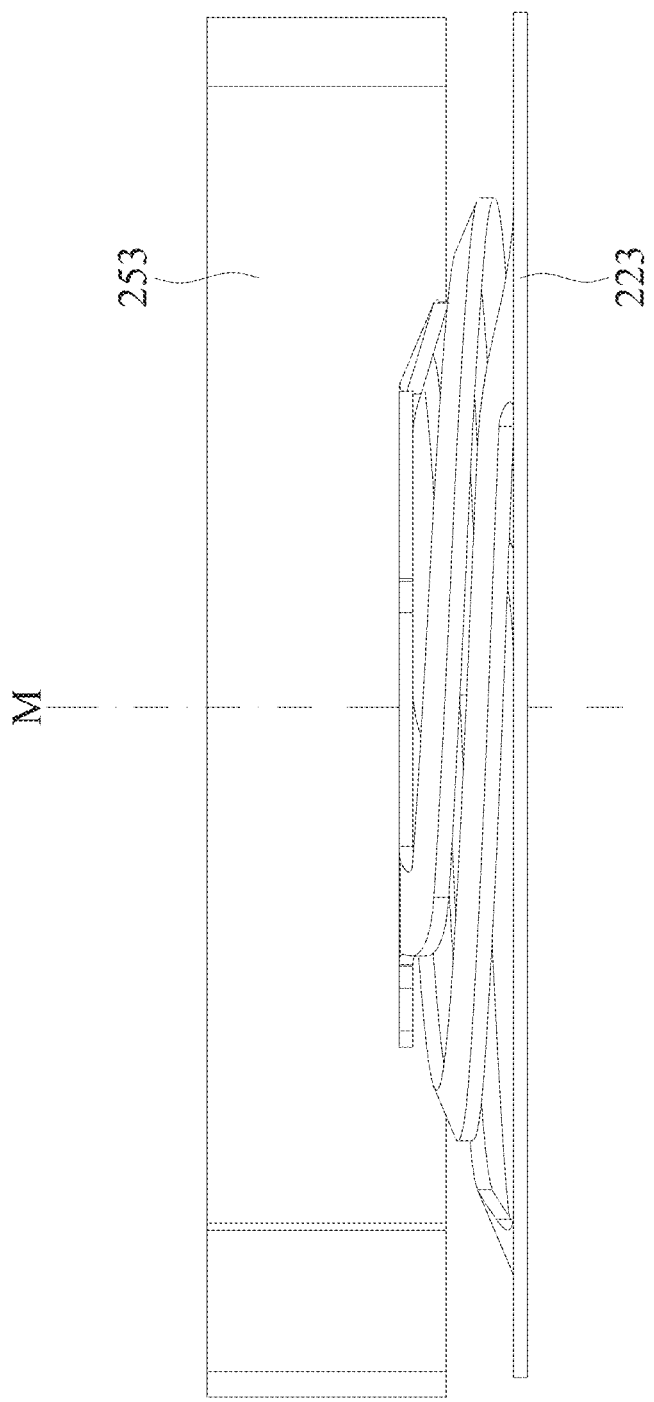
FIG. 10C shows a side view of the first elastic element, and a second elastic element according to an embodiment of the present invention.

FIG. 10C is a side view of the first elastic element 223 and the second elastic element 253. As shown in FIG. 10C, the first elastic element 223 and the second elastic element 253 at least partially overlap when observed along the direction perpendicular to the main axis M. Thus, the vibration module 200 may be more stable, and the internal space of the vibration module 200 is effectively use, and the effect of miniaturization is achieved.

Figure 10D:
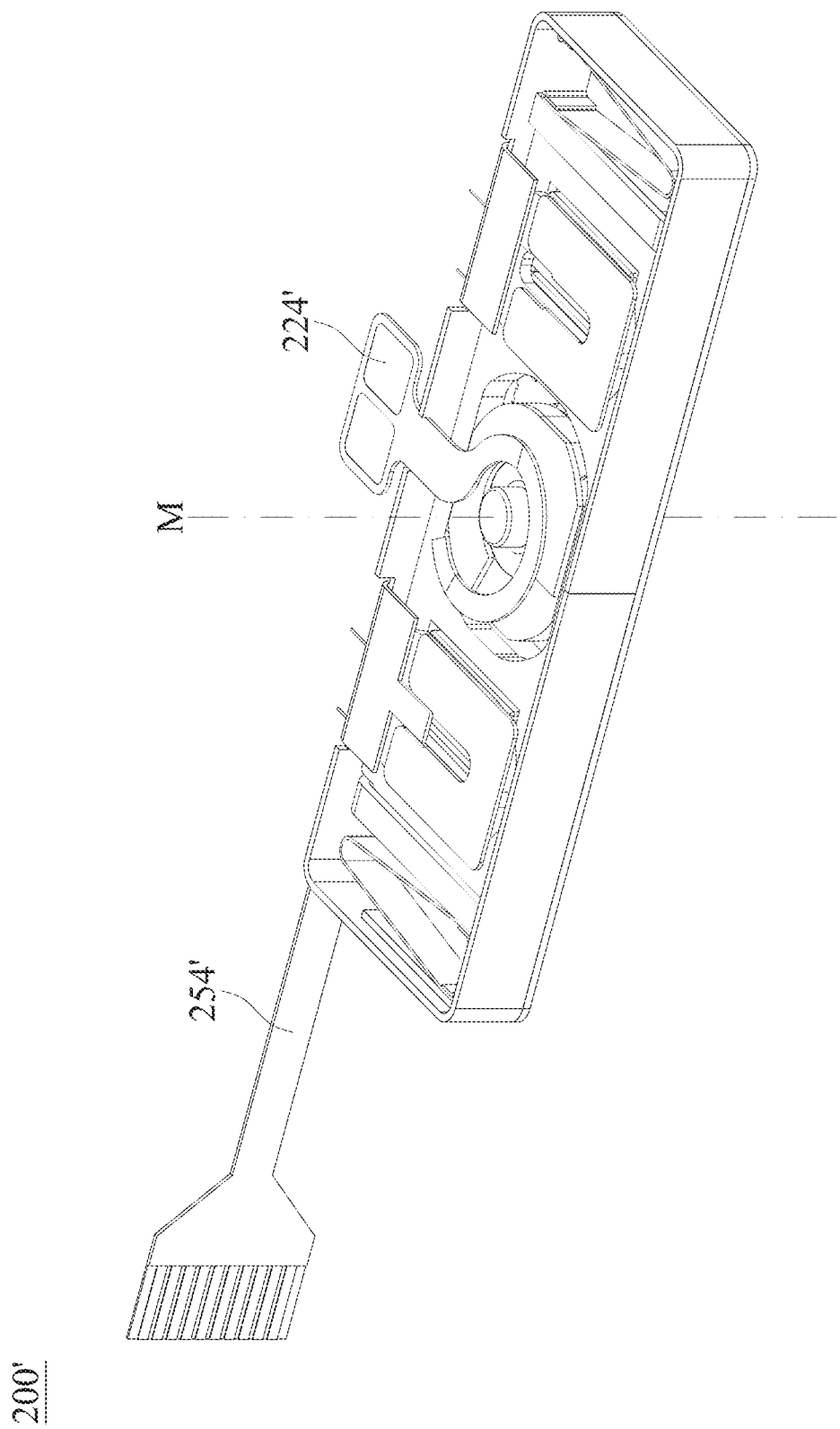
FIG. 10D is a schematic view of the vibration module according to an embodiment similar to FIG. 10A.

FIG. 10D is a schematic view of the vibration module 200' according to an embodiment similar to FIG. 10A. In the embodiment shown in FIG. 10D, most of the elements of the vibration module 200' are the same as the elements of the vibration module 200 of the embodiment shown in FIG. 10A. However, as shown in the FIG. 10D, in this embodiment, the orientation of the first circuit assembly 224' is different from the orientation of the first circuit assembly 224 of the embodiment shown in FIG. 10A. In the embodiment shown in FIG. 10A, the first circuit assembly 224 extends in a direction opposite the second circuit assembly 254. However, in the embodiment shown in FIG. 10D, the first circuit assembly 224' extends toward the second circuit assembly 254'. Therefore, in this embodiment, the first circuit assembly 224' and the second circuit assembly 254' at least partially overlap when observed along the main axis M. Thus, it may be beneficial to the connection between the first circuit assembly 224' and the second circuit assembly 254' and the external power source.

In one embodiment, the vibration module 200 may not be provided with a second circuit assembly 254, and the external current supplied to the first driving assembly 222 and the second driving assembly 252 only via the first circuit assembly 224. Alternatively, in another embodiment, the vibration module 200 may not be provided with a first circuit assembly 224, and the external current supplied to the first driving assembly 222 and the second driving assembly 252 only via the second circuit assembly 254. Thus, the weight of the vibration module 200 may be reduced, and the effect of miniaturization is achieved.

In summary, the embodiments of the present invention provide the vibration module 200 capable of generating a stable vibration in a single direction and two directions, and the vibration module 200 disclosed in the embodiments of the present invention has a lower manufacturing cost and has been miniaturized.

Although embodiments of the present disclosure and their advantages have been described in detail, it should be understood that various changes, substitutions and alterations may be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, the scope of the present disclosure is defined by the scope of the appended claims. In addition, each scope of the claims is constructed as a separate embodiment, and various combinations of the claims and combinations of embodiments are within the scope of the present disclosure.

What is claimed is:

1. A vibration module, having a main axis passing through a center of the vibration module, comprising:
    a fixed part; and
    a first vibration part, disposed within the fixed part, comprising:
        a first moving member, comprising a receiving portion;
        a first driving assembly, driving the first moving member to move along the main axis relative to the fixed part;
        a first elastic element disposed on a first side of the first moving member, wherein the main axis passes through the first side, and the first moving member is movably connected to the fixed part via the first elastic element; and
        a first circuit assembly, electrically connected to the first driving assembly, and comprising an internal electrical connection portion;
    wherein the first moving member comprises a recess facing the first elastic element;
    wherein the first moving member further comprises a shielding element disposed on a second side of the first moving member opposite the first side, wherein the recess and the shielding element at least partially overlap when observed along the main axis;
    wherein the internal electrical connection portion is located at a spiral end of the first circuit assembly and is disposed in the receiving portion, and a part of the first circuit assembly is disposed on the shielding element.

2. The vibration module as claimed in claim 1, wherein the first elastic element comprises a first elastic element connecting portion fixedly connected to the first moving member, and the first elastic element connecting portion comprises a connection strengthening portion, wherein the connection strengthening portion extends in a direction that is not parallel to the main axis.

3. The vibration module as claimed in claim 1, wherein the first driving assembly comprises a first driving magnetic element, wherein the first elastic element, the first moving member and the first driving magnetic element partially overlap when observed along the main axis.

4. The vibration module as claimed in claim 1, further comprising a plurality of first elastic elements electrically connected to the first driving assembly.

5. The vibration module as claimed in claim 1, wherein the first driving assembly comprises a first driving coil, wherein the first elastic element, the first moving member and the first driving coil partially overlap when observed along the main axis.

6. The vibration module as claimed in claim 5, wherein the first elastic element comprises a first elastic element connecting portion, wherein the first elastic element connecting portion is fixedly disposed on the first moving member, and the first elastic element connecting portion and the first driving coil at least not partially overlap when observed along the main axis.

7. The vibration module as claimed in claim 1, wherein the first circuit assembly is disposed on the second side of the first moving member opposite the first side.

8. The vibration module as claimed in claim 7, wherein the first circuit assembly has a flexible structure, and the first moving member is movably connected to the fixed part via the first circuit element.

9. The vibration module as claimed in claim 8, wherein along the main axis, the elastic coefficient of the first elastic element is greater than the elastic coefficient of the first circuit assembly.

10. The vibration module as claimed in claim 8, wherein the receiving portion is located on the second side, wherein the receiving portion has a recessed structure to receive at least a portion of the flexible structure.

11. The vibration module as claimed in claim 1, wherein the recess and the first elastic element at least not partially overlap when observed along the main axis.

12. The vibration module as claimed in claim 1, further comprising a second vibration part disposed in the fixed part, wherein the second vibration part comprises:

a second moving member; and
a second driving assembly, driving the second moving member to move in a direction that is not parallel to the main axis relative to the fixed part.

13. The vibration module as claimed in claim 12, wherein a largest size of the first moving member on the main axis is larger than a largest size of the second moving member on the main axis when observed along a direction perpendicular to the main axis.

14. The vibration module as claimed in claim 12, wherein the second vibrating portion further comprises a second elastic element, and the second moving member is movably connected to the fixed part via the second elastic element, wherein the first elastic element and the second elastic element at least partially overlap when observed along a direction perpendicular to the main axis.

15. The vibration module as claimed in claim 12, wherein the first vibration part has a first natural resonance frequency, and the second vibration part has a second natural resonance frequency, wherein the first natural resonance frequency is different from the second natural resonance frequency.

16. The vibration module as claimed in claim 12, wherein the second vibration part further comprises a second circuit assembly electrically connected to the second driving assembly, wherein the first circuit assembly and the second circuit assembly at least partially overlap when observed along a direction perpendicular to the main axis.

17. The vibration module as claimed in claim 16, wherein the first circuit assembly and the second circuit assembly at least partially overlap when observed along the main axis.

* * * * *